US009980461B2

(12) United States Patent
Kim

(10) Patent No.: US 9,980,461 B2
(45) Date of Patent: May 29, 2018

(54) COLLAPSIBLE PET CRATE

(71) Applicant: Chasing Monkey LLC, Brea, CA (US)

(72) Inventor: Amy Kim, Brea, CA (US)

(73) Assignee: CHASING MONKEY LLC, Brea, CA (US)

( * ) Notice: Subject to any disclaimer, the term of this patent is extended or adjusted under 35 U.S.C. 154(b) by 0 days. days.

(21) Appl. No.: 15/621,999

(22) Filed: Jun. 13, 2017

(65) Prior Publication Data

US 2017/0359998 A1 Dec. 21, 2017

Related U.S. Application Data

(60) Provisional application No. 62/352,924, filed on Jun. 21, 2016.

(51) Int. Cl.
*A01K 1/02* (2006.01)
*A01K 1/00* (2006.01)
*A01K 1/03* (2006.01)

(52) U.S. Cl.
CPC .......... *A01K 1/0035* (2013.01); *A01K 1/0245* (2013.01); *A01K 1/03* (2013.01); *A01K 1/02* (2013.01)

(58) Field of Classification Search
CPC ........ A01K 1/0245; A01K 31/08; A01K 1/03; A01K 1/0125; A01K 1/0035
USPC ....... 119/498, 452, 474, 496, 499, 453, 461, 119/497, 504; 220/6, 666
See application file for complete search history.

(56) References Cited

U.S. PATENT DOCUMENTS

| 3,032,230 | A | * | 5/1962 | Gerber | A45C 5/045 217/125 |
| 3,527,339 | A | * | 9/1970 | Cipolla | B65D 7/26 206/290 |
| 4,590,885 | A | * | 5/1986 | Sugiura | A01K 1/0245 119/497 |
| 5,524,789 | A | * | 6/1996 | Jackman | B65D 5/36 215/900 |
| 5,549,073 | A | * | 8/1996 | Askins | A01K 1/032 119/461 |
| 5,626,098 | A | | 5/1997 | Askins et al. | |
| 5,653,194 | A | | 8/1997 | Guy | |
| 5,904,262 | A | * | 5/1999 | Coppi | B65D 7/26 220/4.29 |

(Continued)

FOREIGN PATENT DOCUMENTS

| CN | 201617075 U | 11/2010 |
| CN | 201928781 U | 8/2011 |

(Continued)

*Primary Examiner* — Yvonne R Abbott-Lewis
(74) *Attorney, Agent, or Firm* — Davidson, Davidson & Kappel, LLC

(57) ABSTRACT

A collapsible pet crate is provided that includes a top; a bottom base; and a plurality of walls including a first wall pair. The first wall pair includes a first wall pivotably connected to the bottom base for pivoting about a first horizontal axis and a second wall pivotably connected to the first wall for pivoting about a first vertical axis. The collapsible pet crate being configured for arrangement in a crating orientation in which the top is removably connected to at least one of the walls and a collapsed orientation in which the top is removably connected to the bottom base. A method of providing a collapsible pet crate is also provided.

16 Claims, 21 Drawing Sheets

(56) References Cited

U.S. PATENT DOCUMENTS

| | | | |
|---|---|---|---|
| 6,345,591 B1* | 2/2002 | Richmond | A01K 1/0245 119/497 |
| 7,021,242 B2* | 4/2006 | Axelrod | A01K 1/0245 119/496 |
| 7,201,116 B2* | 4/2007 | Axelrod | A01K 1/0245 119/453 |
| 7,343,876 B2 | 3/2008 | Frisbee | |
| 8,127,719 B2 | 3/2012 | Jakubowski et al. | |
| 8,267,048 B2* | 9/2012 | Flannery | A01K 1/0245 119/498 |
| 8,408,411 B2* | 4/2013 | Hay | B65D 19/18 119/499 |
| 8,985,058 B2 | 3/2015 | Cantwell et al. | |
| 9,119,375 B2 | 9/2015 | Flannery et al. | |
| 9,339,006 B1 | 5/2016 | Eby | |
| 2005/0034679 A1* | 2/2005 | Link | A01K 1/0245 119/474 |
| 2010/0313822 A1 | 12/2010 | Huang | |
| 2013/0043241 A1* | 2/2013 | Hunter | B65D 25/005 220/6 |
| 2014/0190421 A1 | 7/2014 | Nichols | |
| 2014/0209036 A1 | 7/2014 | Cantwell et al. | |

FOREIGN PATENT DOCUMENTS

| | | |
|---|---|---|
| CN | 202211055 U | 5/2012 |
| CN | 203243797 U | 10/2013 |
| CN | 204653312 U | 9/2015 |
| GB | 2238296 A | 5/1991 |

\* cited by examiner

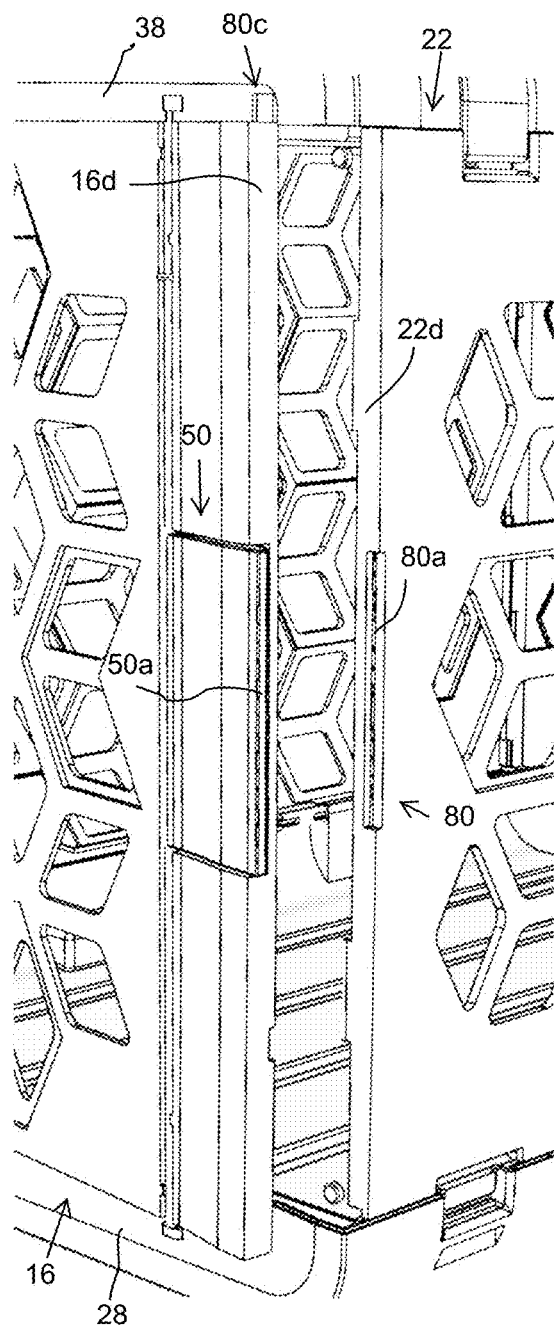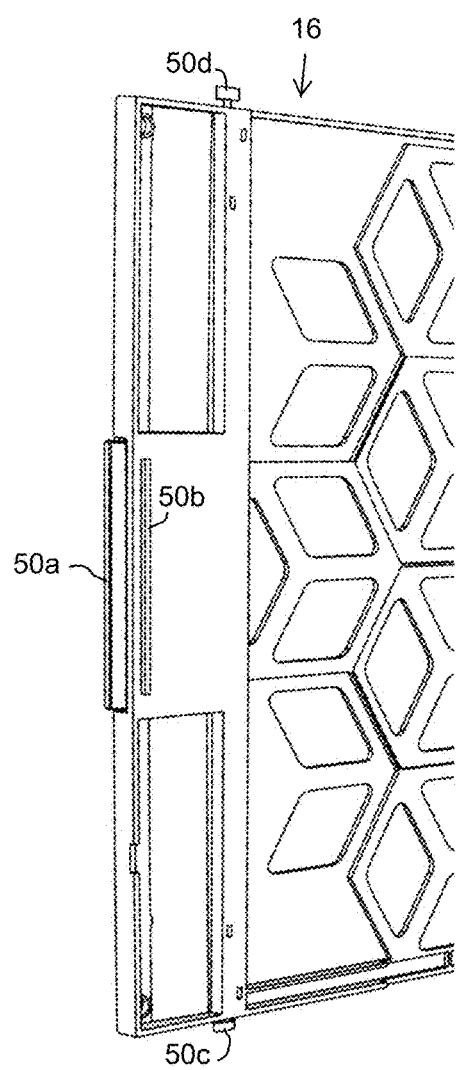
Fig. 10b
Fig. 10c

COLLAPSIBLE PET CRATE

This claims the benefit of U.S. Provisional Patent Application 62/352,924, filed on Jun. 21, 2016, which is hereby incorporated by reference herein.

The present disclosure relates generally to pet crates and more specifically to collapsible pet crates.

BACKGROUND

U.S. Pat. No. 9,119,375 B2, U.S. Pat. No. 8,127,719 B2, CN 201617075U, U.S. Pat. No. 8,985,058 B2, U.S. Pub. 2014/0190421 A1, U.S. Pat. No. 9,339,006 B1 and U.S. Pub. 2014/0209036 A1 disclose pet crates.

SUMMARY OF THE INVENTION

A collapsible pet crate is provided that includes a top; a bottom base; and a plurality of walls including a first wall pair. The first wall pair includes a first wall pivotably connected to the bottom base for pivoting about a first horizontal axis and a second wall pivotably connected to the first wall for pivoting about a first vertical axis. The collapsible pet crate being configured for arrangement in a crating orientation in which the top is removably connected to at least one of the walls and a collapsed orientation in which the top is removably connected to the bottom base.

A collapsible pet crate is also provided that includes a top; a bottom base; and a plurality of walls including a first wall pair. The first wall pair includes a first wall movably connected to the bottom base and a second wall movably connected to the first wall. The collapsible pet crate is configured for arrangement in a crating orientation in which the top is removably connected to at least one of the walls and a collapsed orientation in which the top is removably connected directly to the bottom base. The top includes at least one first connector configured for removably connecting the top to at least one of the first or second walls in the crating orientation and for removably connecting the top to bottom base in the collapsed orientation.

A collapsible pet crate is also provided that includes a top; a bottom base; and a plurality of walls including a first wall pair. The first wall pair includes a first wall connected to the bottom base and a second wall connected to the first wall. The collapsible pet crate is configured for arrangement in a crating orientation in which the top is removably connected to at least one of the walls and a collapsed orientation in which the top is removably connected to the bottom base and the first wall pair is held between the top and the bottom base.

A collapsible pet crate is also provided that includes a top; a bottom base; and a plurality of walls including a first wall pair. The collapsible pet crate is configured for arrangement in a crating orientation in which the top is removably connected to the first wall and a collapsed orientation in which the top is removably connected to the bottom base and the first wall pair is held between the top and the bottom base. The first wall pair is connected to the bottom base in both the crating orientation and the collapsed orientation.

A method of providing a collapsible pet crate is also provided. The method includes pivotably connecting a first wall to a bottom base such that the first wall is pivotable with respect to the bottom base about a first horizontal axis; pivotably connecting a second wall to the first wall such that the second wall is pivotable with respect to the first wall about a first vertical axis; and providing a top configured for being removably connected to at least one of the walls in a crating orientation and configured for being removably connected directly to the bottom base in a collapsed orientation.

BRIEF DESCRIPTION OF THE DRAWINGS

The present invention is described below by reference to the following drawings, in which:

FIG. 10b shows an enlarged view of a door latch of the first embodiment;

FIG. 10c shows a view of the door latch view from the interior side;

DETAILED DESCRIPTION

Figure 1:
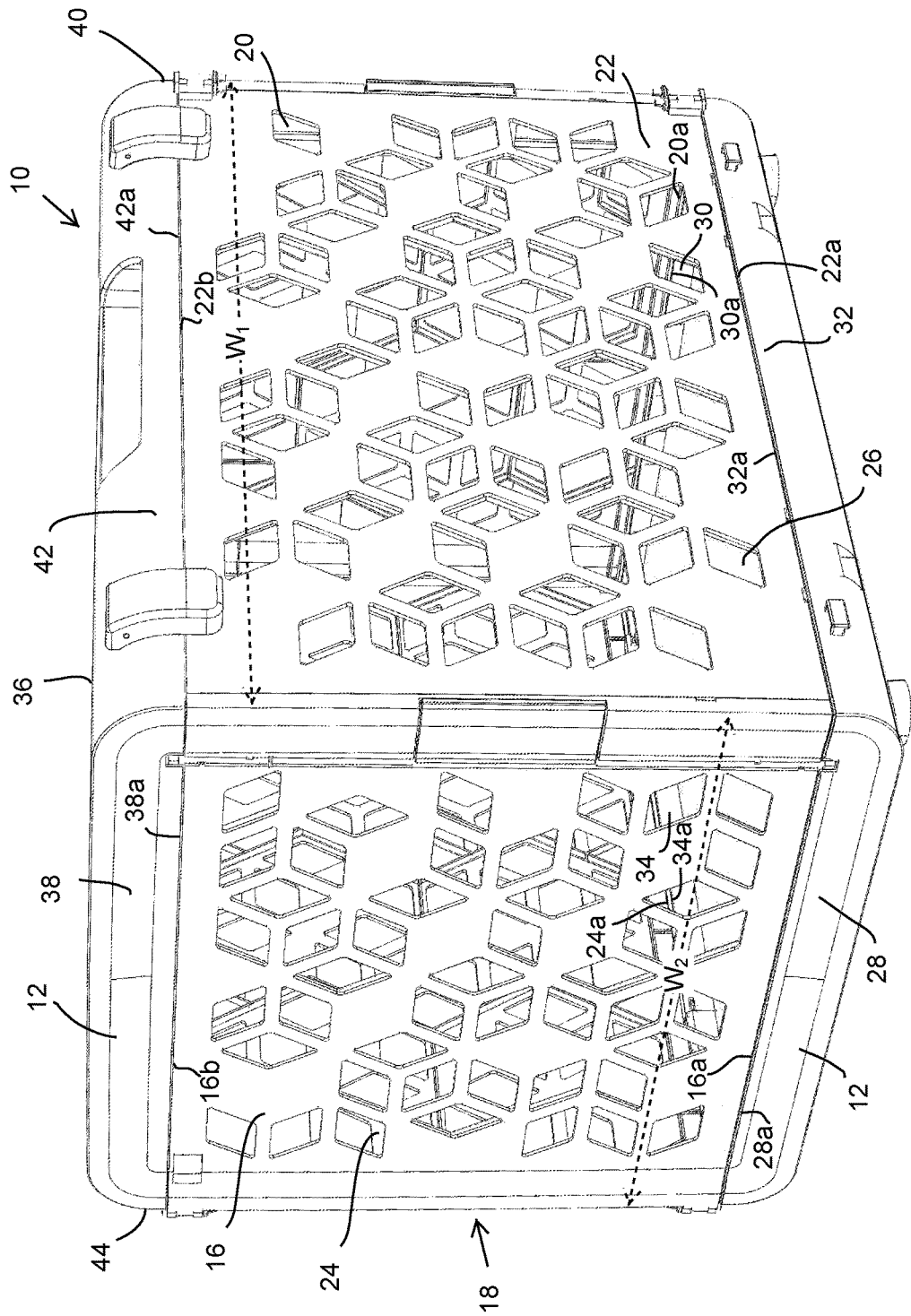
FIG. 1 shows a perspective view of a collapsible pet crate in accordance with a first embodiment of the present invention in a crating orientation.
Figure 9:
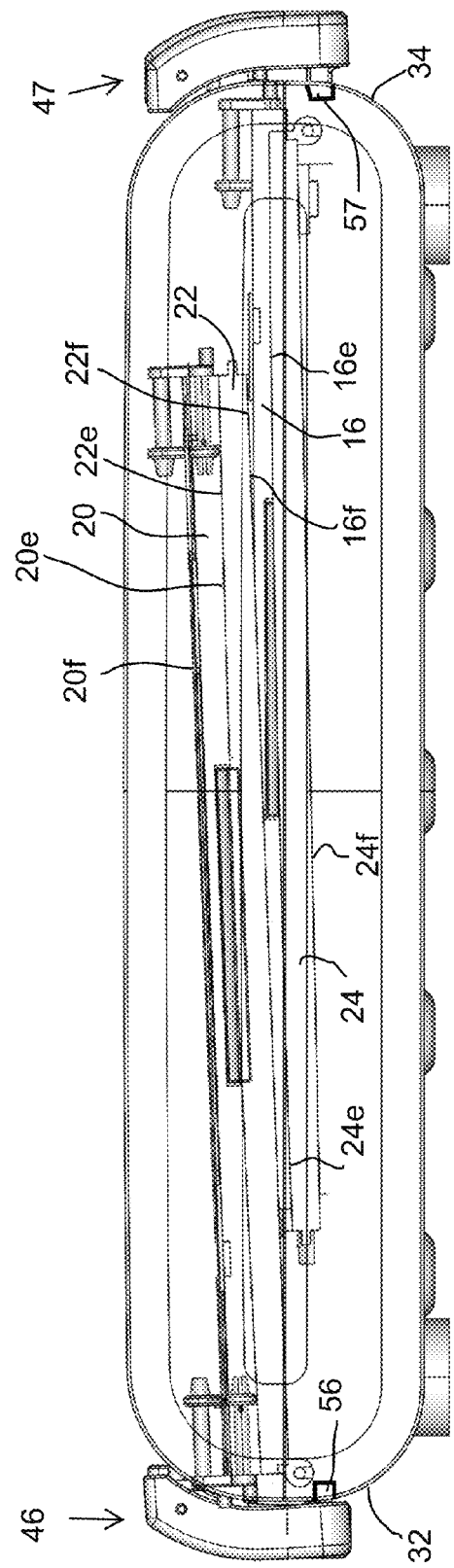

FIG. 1 shows a perspective view of a collapsible pet crate 10 in accordance with an embodiment of the present invention. Pet crate 10 is configured for collapsing from a crating orientation, as shown in FIG. 1, in which pet crate 10 is oriented for housing a pet, to a collapsed orientation, as shown in FIG. 9, in which pet crate 10 can be easily carried. Pet crate 10 is formed as a cuboid with rounded corners and includes a bottom base 12, a top 14, a front wall 16 defining a door 18, a back wall 20, a first side wall 22 and a second side wall 24. Door 18 is pivotably mounted with respect to the remainder of crate. In this embodiment, this pivotable mounting is formed via a pivotable connection to a side wall 24 such that when crate 10 is in the crating orientation door 18 can be swung between an open orientation, in which a pet to can pass in and out of front wall 16, and a closed orientation, in which door 18 obstructs passage of the pet via front wall 16. In the open orientation, door 18 is disengaged from side wall 22 and in the closed orientation door 18 is latched to side wall 22. In a preferred embodiment, each of bottom base 12, top 14, front wall 16, back wall 20, first side wall 22 and second side wall 24 are formed of injected molded plastic. Walls 16, 20, 22, 24 are each provided with a plurality of slots formed therein to allow air to pass in and out of crate 10 in the crating orientation.

Base 12 includes a bottom wall 26 extending horizontally and four wall sections 28, 30, 32, 34 protruding vertically upward from bottom wall 26. More specifically, base 12 includes a front wall section 28, a back wall section 30, a first side wall section 32 and a second side wall section 34. In this embodiment, bottom wall 26 and wall sections 28, 30, 32, 34 are formed integrally as a single rigid piece.

Top 14 includes a top wall 36 extending horizontally, parallel to bottom wall 26, and four wall sections 38, 40, 42, 44 protruding vertically downward from top wall 36. More specifically, top 14 includes a front wall section 38, a back wall section 40, a first side wall section 42 and a second side wall section 44. In this embodiment, top wall 36 and wall sections 38, 40, 42, 44 are formed integrally as a single rigid piece.

Side walls 22, 24 each are of a width W1 that is greater than a width W2 of each of front wall 16 and back wall 20. Wall sections 32, 34, 42, 44 also have a width W1 and wall sections 28, 30, 38, 40 also have a width W2. As used herein, the term front wall is used to denote the wall with the door, while back wall is used to denote the wall opposite the front wall and the side walls are those that extend between the front and back walls. As noted above, in this embodiment door 18 is provided by front wall 16, which is one of the narrower walls. In other embodiments, the front wall and back wall may be wider than the side walls.

In the crating orientation, front wall 16 is sandwiched vertically between bottom front wall section 28 and top front wall section 38, back wall 20 is sandwiched vertically between bottom front wall section 30 and top front wall section 40, first side wall 22 is sandwiched vertically between bottom first side wall section 32 and top first side wall section 42 and second side wall 24 is sandwiched vertically between bottom second side wall section 34 and top second side wall section 44. More specifically, with respect to front wall 16, a bottom horizontally extending edge 16a of wall 16 rests on top of a top horizontally extending edge 28a of bottom front wall section 28 and a bottom horizontally extending edge 38a of top front wall section 38 rests on top of a top horizontally extending edge 16b of front wall 16. Similarly, with respect to back wall 20, a bottom horizontally extending edge 20a of wall 20 rests on top of a top horizontally extending edge 30a of bottom back wall section 30 and a bottom horizontally extending edge of top front wall section 40 rests on top of a top horizontally extending edge 20b (FIG. 2) of back wall 20; with respect to first side wall 22, a bottom horizontally extending edge 22a of wall 22 rests on top of a top horizontally extending edge 32a of bottom first side wall section 32 and a bottom horizontally extending edge 42a of top side wall section 42 rests on top of a top horizontally extending edge 22b of side wall 22; with respect to second side wall 24, a bottom horizontally extending edge 24a of wall 24 rests on top of a top horizontally extending edge 34a of bottom second side wall section 34 and a bottom horizontally extending edge of top side wall section 44 rests on top of a top horizontally extending edge 24b (FIG. 2) of side wall 24.

Front side wall 16 is pivotably connected to second side wall 24 such that walls together form a first wall pair and back wall 20 is pivotably connected to first side wall 22. Top 14 is removably connected to at least one of the walls 16, 22 of the first wall pair and to at least one of the walls 20, 24 of second wall pair. In preferred embodiments, top 14 is removably connected to at least two opposing walls, with front wall 16 and back wall 20 being opposing walls and first side wall 22 and second side wall 24 being opposing side walls. In other words, top 14 may be removably connected to at least both of front and back walls 16, 20 or to at least both of side walls 22, 24. In the embodiment shown in FIGS. 1 to 9, in the crating orientation, top 14 is removably connected to side walls 22, 24 and is not connected to front wall 16 and back wall 20. As implied above, in other embodiments, top 14 may be removably connectable to all of walls 16, 20, 22, 24.

Figure 2:
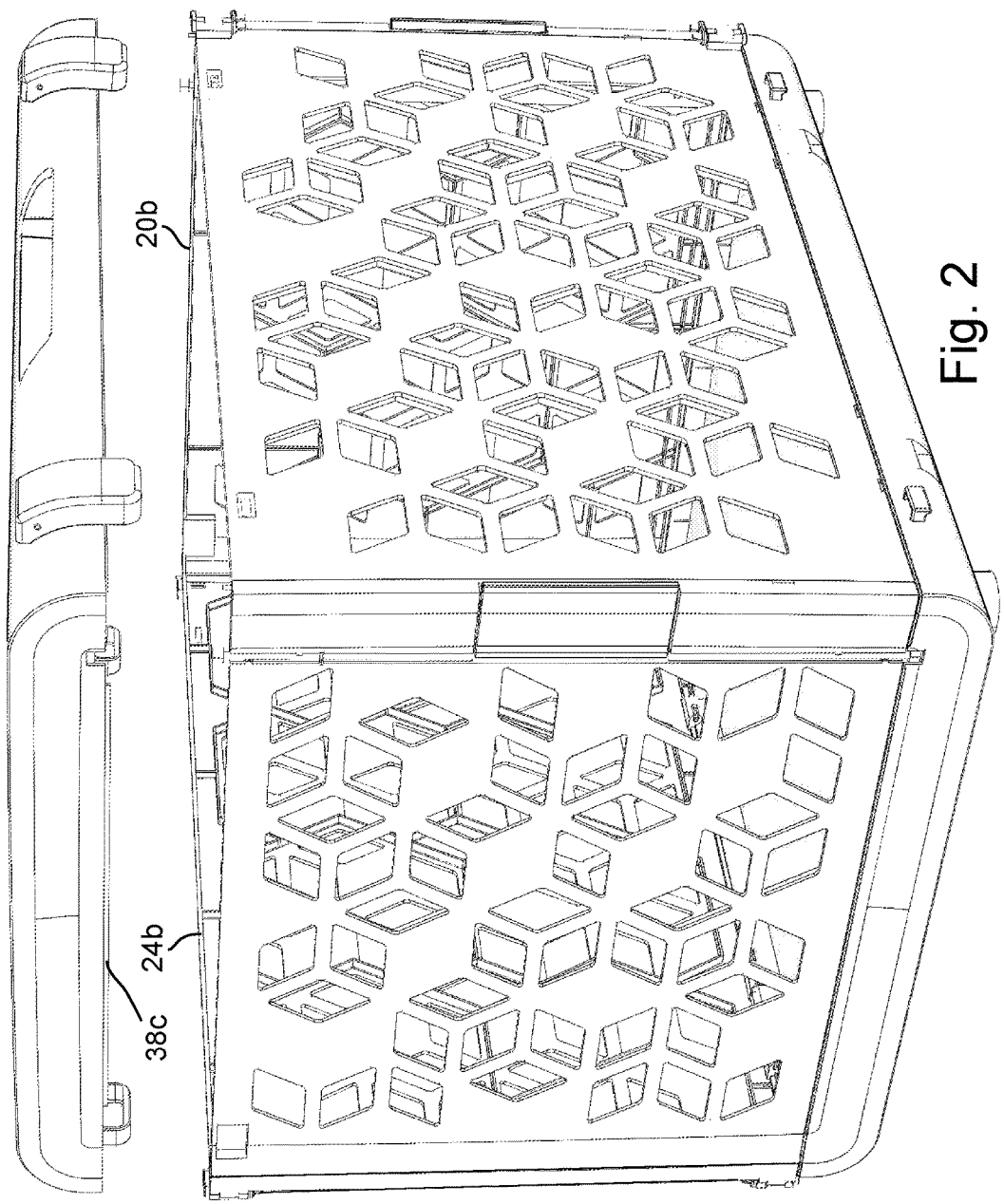
FIG. 2 shows the pet crate of the first embodiment in an intermediate orientation in which a top is removed from walls of the pet crate.

FIG. 2 shows top 14 disconnected from both of the side wall pairs. As is apparent from FIG. 2, top 14 is removably connectable to side wall 22 by a first pair of connectors 46 that each are configured for removably connecting to a respective connecting section of wall 22 and by a second pair of connectors 47 that each are configured for removably connecting to a respective connecting section of wall 24. More specifically, connectors 46 top 14 is removably connectable to side wall 22 by a first pair of connectors 46 that each snap onto a corresponding one of two protrusions 48 formed on front wall 16 near top edge 16*b* and top 14 is removably connectable to side wall 24 by connectors 47 that each snap onto a corresponding one of the two protrusions 49 formed on back wall 20 near top edge 20*b*. Connectors 47 are formed in the same manner as connectors 46 and thus the below description of connectors 46 also applies to connectors 47. Connectors 46 each include a leg 46*a* fixed to top first side wall section 42 at a rounded outer surface of section 42 and extending downward past bottom edge 42*a* onto an outer surface of wall 22 and a receptacle 46*b* formed in leg 46*a* of the respective connector 46 for receiving the respective protrusion 48. Upper portions of legs 46*a* are rounded to contour to the rounded outer surface of wall section 42 so as to sit flush against the rounded outer surface of wall section 42. Lower portions of legs 46*a*, which define receptacles 46*b*, extend straight to contour to the flat outer surface of wall 22 so as to sit flush against the flat outer surface of wall 22.

Wall section 38 also each includes a downwardly extending projection 38*c* at bottom edge 38*a* configured for being received in corresponding slot in top edge 16*b* of wall 16 and section 40 includes an identical downwardly extending projection to align walls sections 38, 40, 42, 44 with the respective walls 16, 20, 22, 24 and add further stability to the connection between top 14 and the wall pairs.

Figure 3:
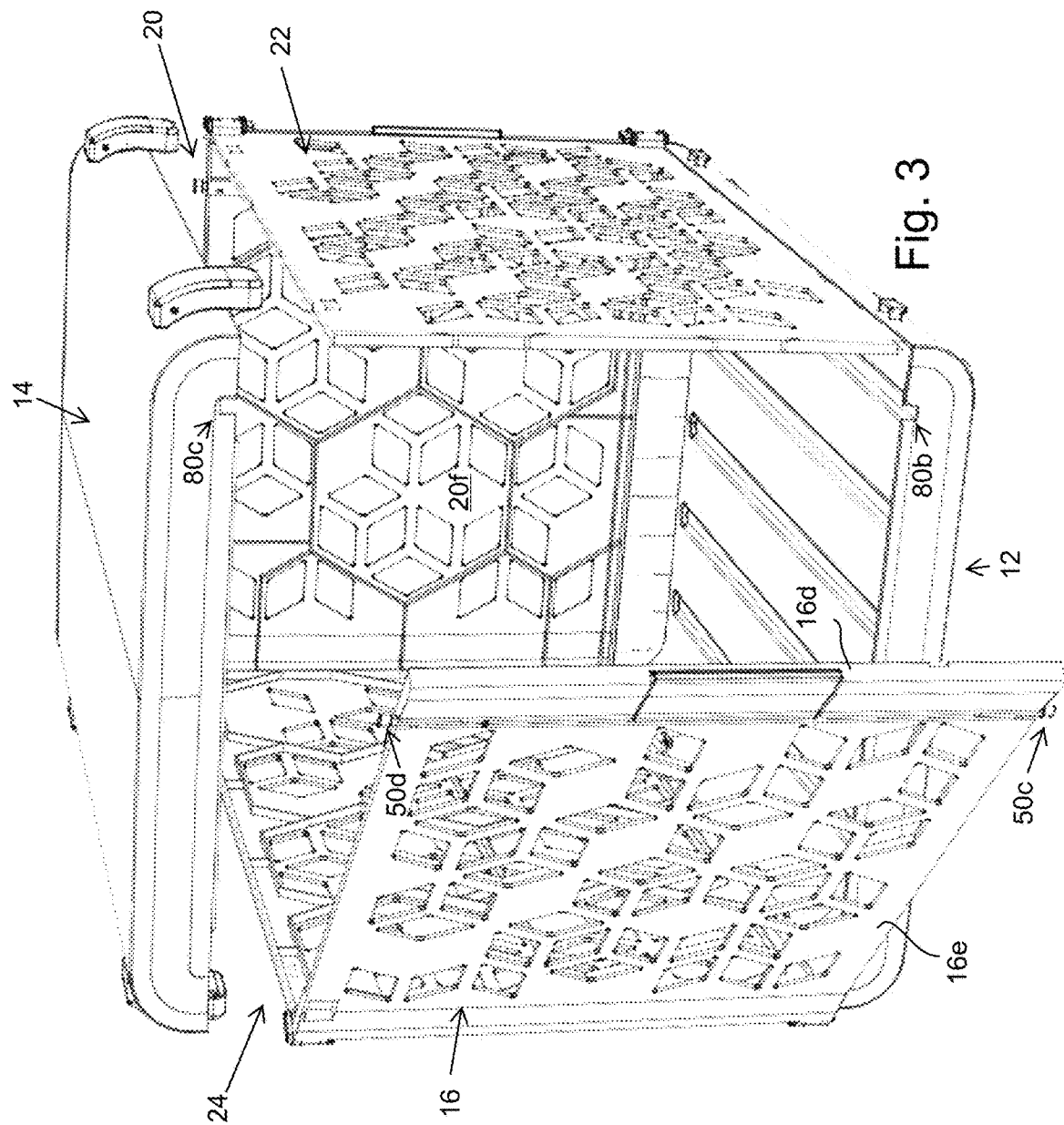
FIG. 3 shows the pet crate of the first embodiment in another intermediate orientation with a first wall partially pivoted about a vertical axis with respect to a second wall.

Referring now to FIG. 3, front wall 16 is pivotably connected to second side wall 22 by for example at least one hinge 51 (FIG. 4) such that when top 14 is disconnected from walls 16, 20 and removed from walls 16, 20, 22, 24, front wall 16 is pivotable with respect to side wall 22 about a first vertically extending axis VA1. In the crating orientation, when top 14 is connected to wall 16 by connectors 46, a latch 50 configured for engaging with an edge of side wall 22 prevents front wall 16 from being swung about axis VA1 such that front wall 16 is fixed with respect to side wall 22 and cannot be swung about axis VA1 away from side wall 22. By front wall 16 being swung away from side wall 22, it is meant that a free side edge 16*d* of front wall 16 moves further away from a front side edge 22*d* of side wall 22, and by front wall 16 being swung toward side wall 22, it is meant that free side edge 16*d* of front wall 16 moves closer to front side edge 22*d* of side wall 22. Referring to FIGS. 2 to 5 together, when latch 50 is in an unlocked orientation, front wall 16 may be swung outward away from side wall 22 approximately 270 degrees about axis VA1 and toward side wall 24 such that an exterior surface 16*e* of front wall 16 contacts an exterior surface 24*e* (FIG. 6) of side wall 24. As used herein, interior surfaces of walls 16, 20, 22, 24 refer to surfaces of walls 16, 20, 22, 24 that face an interior of crate 10 when crate 10 is in the crating orientation and exterior surfaces of walls refer to surfaces of walls 16, 20, 22, 24 that face an interior of crate 10 when crate 10 is in the crating orientation. In this embodiment, interior surfaces of walls 16, 20, 22, 24 are each provided with hexagonal support structures to add further rigidity to walls 16, 20, 22, 24.

FIG. 3 shows a view of crate 10 after top 14 has been disconnected from side walls 22, 24, after top has been removed from the tops of walls 16, 18, 20, 22 and after latch 50 is moved into the unlocked orientation and with front wall 16 having been swung away from side wall 22 about axis VA1 approximately 30 degrees. It should be noted that due to the configuration of front wall 16 as door 18, front wall 16 is openable, i.e., pivotable about axis VA1, when top 14 connected to side walls 22, 24 when latch 50 is in the unlocked orientation.

Figure 4:
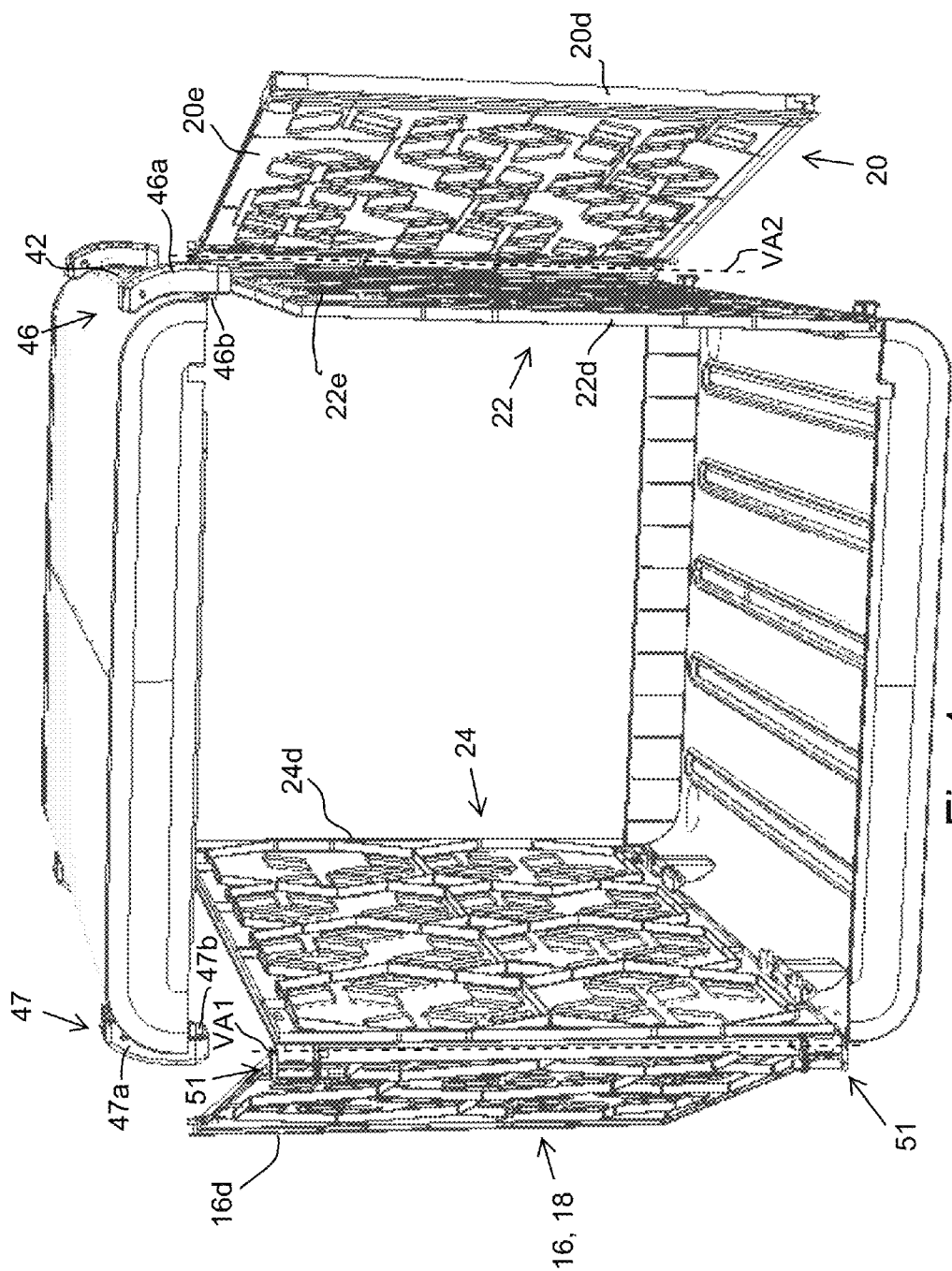
FIG. 4 shows the pet crate of the first embodiment in another intermediate orientation with the first wall further pivoted about the vertical axis toward the second wall and a third wall partially pivoted about a vertical axis with respect to a fourth wall.

FIG. 4 shows a view of crate 10 after front wall 16 has been swung further about axis VA1 toward side wall 24 such that door 18 is approximately 240 degrees from the closed orientation when door 18 contacts side wall 22 and edge 16*d* is closer to edge 24*d* than in FIG. 3, and after back wall 20 has been swung away from side wall 24 approximately 240 degrees about a vertical axis VA2, at which back wall 20 is pivotably connected to side wall 22, toward side wall 22. Back wall 20 is pivotably connected to first side wall 22 by for example at least one hinge 52 (FIG. 6) such that when top 14 is disconnected from walls 16, 20 and removed from walls 16, 20, 22, 24, back wall 20 is pivotable with respect to side wall 22 about vertically extending axis VA2. In the crating orientation, when top 14 is connected to wall 20 by connectors 47, a latch, which is configured in the same manner as latch 50, connects back wall 20 to side wall 24 to prevent back wall 20 from being swung about axis VA2 toward side wall 22 and away from side wall 24. By back wall 20 being swung away from side wall 24, it is meant that a free side edge 20*d* of back wall 20 moves further away from a back side edge 24*d* of side wall 24 and closer to a front side edge 22*d* along an arced travel path of edge 20*d* (from a sheer distance standpoint, it is apparent that after back wall 20 is pivoted about axis VA2 180 degrees from a closed orientation in which wall 20 contacts wall 24, further rotation by 90 degrees causes edge 20*d* to move back toward edge 24*d*, but edge 20*d* continues to move further away from edge 24*d* in terms of travel distance), and by back wall 20 being swung toward side wall 22, it is meant that free side edge 20*d* of back wall 20 moves closer to front side edge 22*d* of wall 22 and further away from back side edge 24*d* of side wall 24 along the arced travel path of edge 20*d*. When the latch for back wall 20 is in an unlocked orientation, back wall 20 may be swung toward side wall 22 such that an exterior surface 20*e* of back wall 20 directly faces and contacts (or is spaced from by less than an inch) an exterior surface 22*e* of side wall 22 and an interior surface 20*f* (FIG. 3) of back wall 20 faces outward away from side walls 22, 24.

Figure 5:
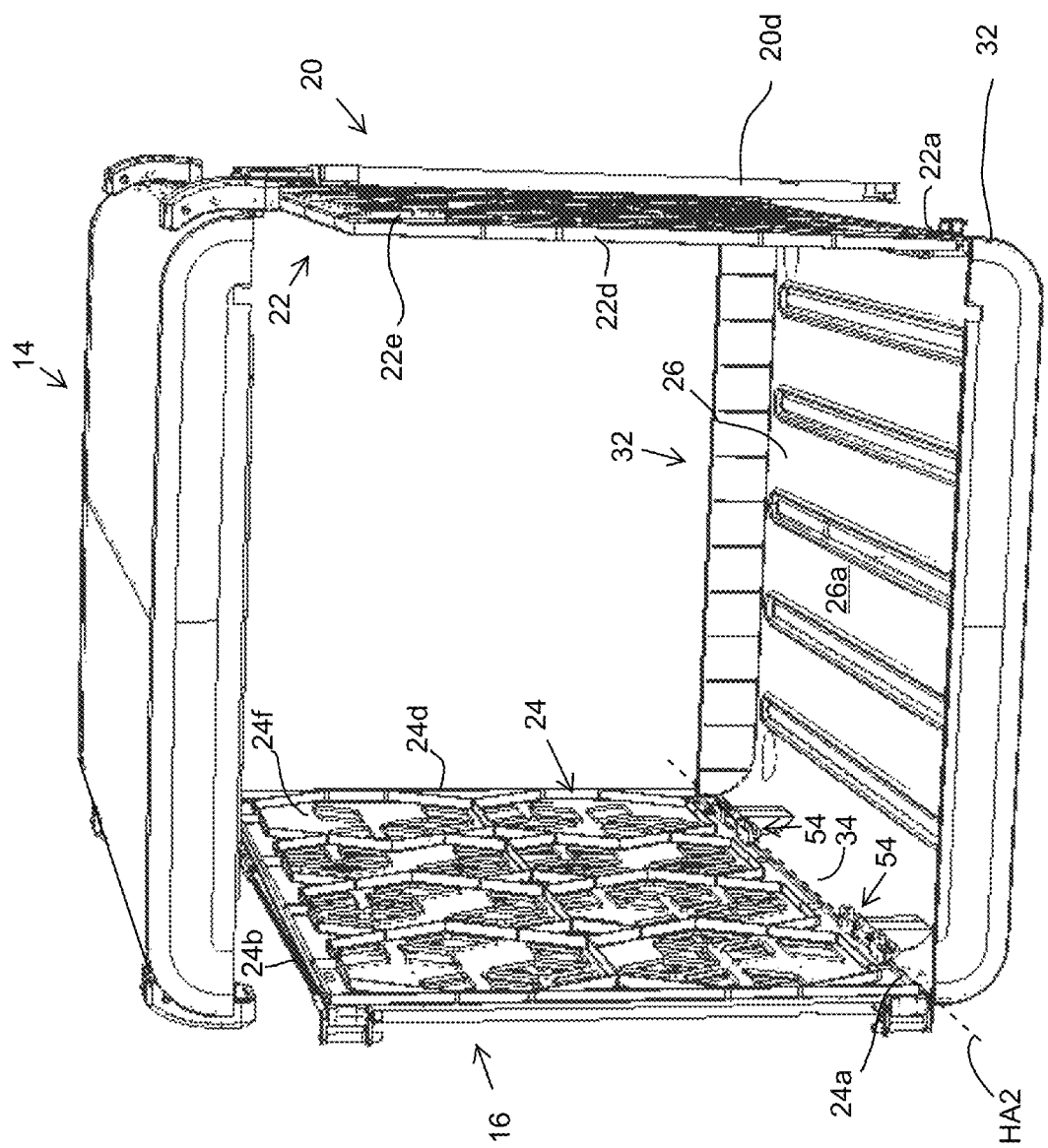
FIG. 5 shows the pet crate of the first embodiment in another intermediate orientation with the first wall substantially fully pivoted about the vertical axis toward the second wall and the third wall substantially fully pivoted about the vertical axis toward the fourth wall.
Figure 6:
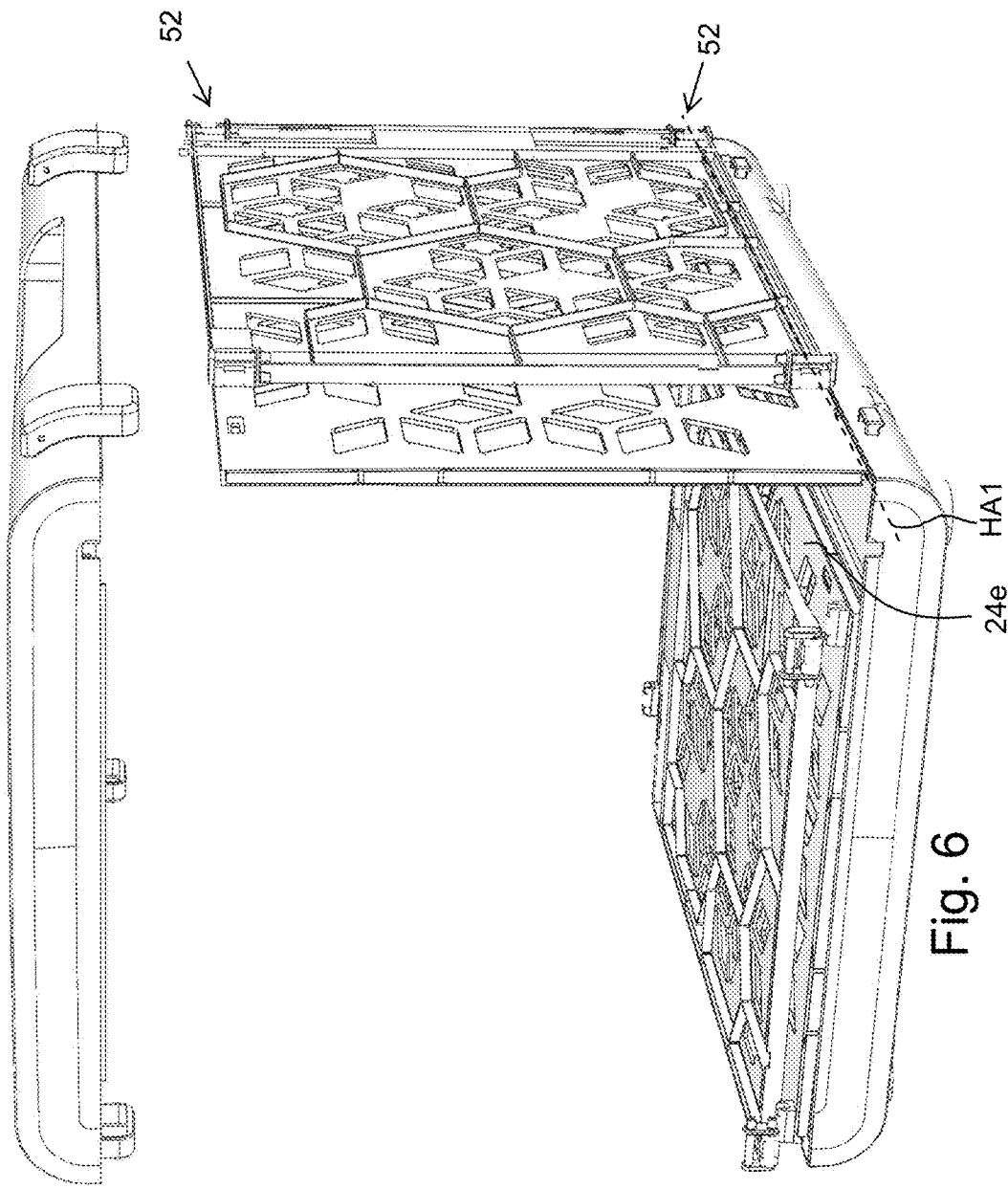
FIG. 6 shows the pet crate of the first embodiment in another intermediate orientation with the first wall folded against the second wall and the first and second walls fully pivoted about a first horizontal axis and folded into the bottom, while the third wall is folded against the fourth wall and the third and fourth walls remain upright.

FIG. 5 shows a view of crate 10 after back wall 20 has been swung further, in comparison with the view of FIG. 4, toward side wall 22 such that at least a portion of exterior surface 20*e* (FIG. 4) contacts exterior surface 22*e* and edge 20*d* is closest to edge 22*d*; and after front wall 16 has been swung further, in comparison with the view of FIG. 4, toward side wall 24 such that at least a portion of exterior surface 16*e* (FIG. 3) contacts exterior surface 24*e* (FIG. 6) and edge 16*d* (FIG. 3) is closest to edge 24*d*. Side wall 22, along bottom edge 22*a*, is pivotably connected to side wall section 32 of bottom 12 such that when top 14 is disconnected from walls 22, 24 and removed from walls 16, 20, 22, 24, particularly when exterior surface 20*e* of back wall 20 is pressed against exterior surface 22*e* of side wall 22, side wall 22 is pivotable with respect to side wall section 32 about a first horizontally extending axis HA1 (FIG. 6). Similarly, side wall 24, along bottom edge 24*a*, is pivotably connected to side wall section 34 of bottom 12 such that when top 14 is disconnected from walls 22, 24 and removed from walls 16, 20, 22, 24, particularly when exterior surface 16*e* of back wall 16 is pressed against interior surface 24*e* of side wall 24, side wall 24 is pivotable with respect to side wall section 34 about a horizontally extending axis HA2. Side wall 24 is pivotably connected to side wall section 34 of bottom 12 by for example at least one hinge 54, while side wall 22 is pivotably connected to side wall section 32 of bottom 12 by for example at least one hinge 55 (FIG. 7) configured in the same manner as hinge 54.

Bottom wall sections 28, 30, 32, 34 each have a same height and walls 16, 20, 22, 24 are each of the same height such that the top edges of walls 16, 20, 22, 24 are all positioned at a same height and along a same horizontal plane when walls 16, 20, 22, 24 are in the crating orientation, with the heights being measured from the bottommost edges of sections 28, 30, 32, 34, i.e., from a bottom plane of a bottom surface of bottom wall 26, to top edges 28a, 30a, 32a, 34a, respectively. The first wall pair, i.e., walls 16, 24, may be swung downward about axis HA2 to rest against a top surface 26a of bottom wall 26, then the second wall pair, i.e., walls 20, 22, may be swung downward about axis HA1 to rest on top of the first wall pair. More specifically, walls 16, 24 may be together swung, with wall 16 being swung onto wall 24 such that walls 16, 24 are substantially parallel to each other and exterior surfaces 16e, 22e face each other, downward about axis HA2 such that at least a portion of an interior surface 24f of side wall 24, in particular a portion directly adjacent to top edge 24b, contacts top surface 26a of bottom wall 26. Next, walls 20, 22 may be together swung, with wall 20 being swung onto wall 22 such that walls 20, 22 are substantially parallel to each other and exterior surfaces 20e, 22e face each other, downward about axis HA1 such that at least a portion of interior surface 22f of side wall 22, for example a portion directly adjacent to example top edge 22b, contacts interior surface 16f of front wall 16.

Figure 7:
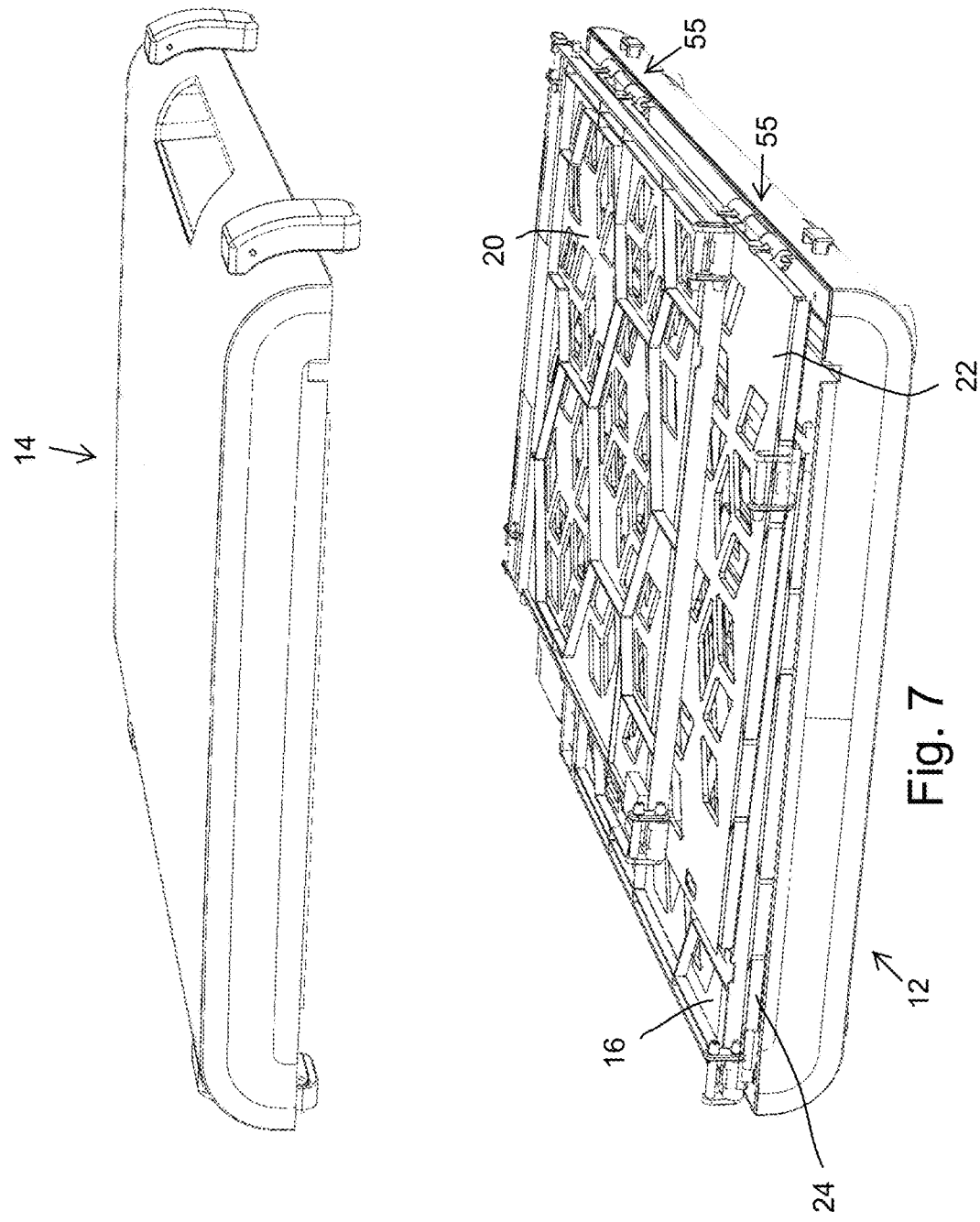
FIG. 7 shows the pet crate of the first embodiment with the first to fourth walls in the collapsed orientation on the bottom, with the first and second walls fully pivoted about the first horizontal axis and folded into the bottom and the third and fourth walls fully pivoted about the second horizontal axis and folded onto the bottom on top of the first and second walls.

The pivoting of the wall pairs about axes HA1, HA2 (FIGS. 5, 6) is illustrated in FIGS. 6 and 7. FIG. 6 shows pet crate 10 with the front wall 16 folded against side wall 24 and walls 16, 24 pivoted about first horizontal axis HA1 and folded into bottom 12, while back wall 20 is folded against side wall 22 and walls 20, 22 are not yet pivoted about second horizontal axis HA2 downward toward bottom 12. FIG. 7 shows pet crate 10 with walls 16, 20, 22, 24 in the collapsed orientation in bottom 12, with walls 16, 24 fully pivoted about the first horizontal axis HA1 and folded into bottom 12 and walls 20, 22 fully pivoted about the second horizontal axis HA2 and folded into bottom 12 on top of walls 16, 24.

Fully pivoting walls 16, 20, 22, 24 downward into bottom 12 positions walls 16, 20, 22, 24 between wall sections 28, 30, 32, 34 such that at least a portion of the structures of walls 16, 20, 22, 24 taken together is positioned within bottom 12. More specifically, the walls 16, 20, 22, 24 are folded into bottom 12 a sufficient amount to allow top 14 to be connected to bottom 12 such that walls 16, 20, 22, 24 are enclosed within bottom 12 and top 14 and walls 16, 20, 22, 24 are arranged in a space extending vertically between top wall 36 of top 14 and bottom wall 26 (FIG. 1) of bottom 12. When in the collapsed orientation in bottom 12, as shown in Figs. and 9, the first wall pair is sandwiched vertically between bottom wall 26 and the second wall pair. More specifically, when walls 16, 20, 22, 24 are in the collapsed orientation, side wall 24 is positioned on top of bottom wall 26, front wall 16 is positioned on top of side wall 24, side wall 22 is positioned on top of front wall 16 and back wall 20 is positioned on top of side wall 22. Even more specifically, when walls 16, 20, 22, 24 are in the collapsed orientation, interior surface 24f of side wall 24 directly faces and/or contacts top surface 26a of bottom 26, exterior surface 16e of front wall 16 directly faces and/or contacts exterior surface 24e of side wall 24, interior surface 22f of side wall 22 directly faces and/or contacts interior surface 16f of front wall 16, and exterior surface 20e of back wall 20 directly faces and/or contacts exterior surface 22e of side wall 22. In the embodiment shown in FIG. 9, walls 16, 20, 22, 24 are all arranged within 15 degrees of parallel to bottom wall 26. When top 14 is connected to bottom 12, interior surface 20f of back wall 20 directly faces a bottom surface of top wall 36.

Figure 8:
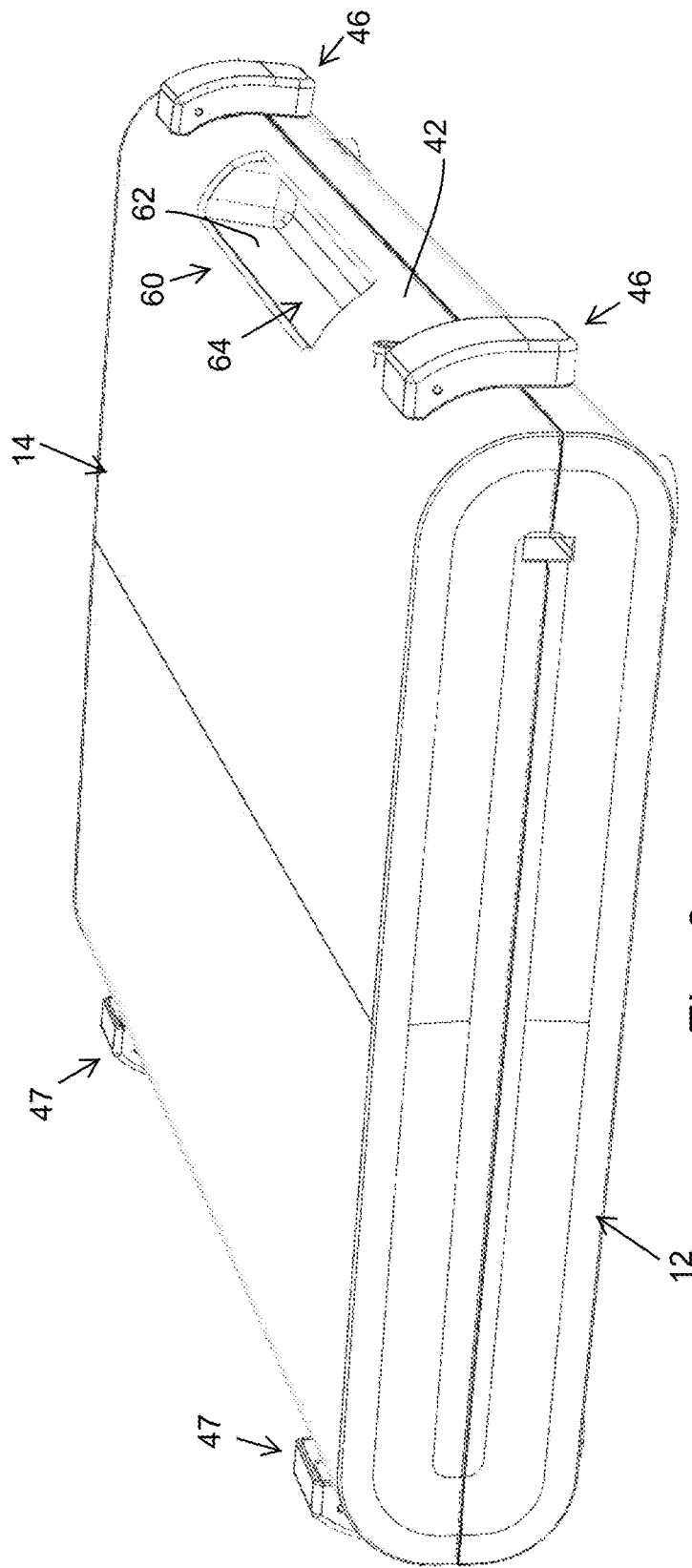
FIGS. 8 and 9 show the pet crate of the first embodiment in the collapsed orientation, with the first to fourth walls folded into the bottom and the top connected to the bottom.

As shown in FIGS. 8 and 9, after the wall pairs are folded about the respective axes HA1, HA2 into bottom 12, top 14 can be removably connected directly to bottom 12 by inserting connectors 46 onto protrusions 56 in side wall section 32, while inserting connectors 47 onto protrusions 57 in side wall section 34. Accordingly, connectors 47, 49 form connectors that connect top 14 directly to the wall pairs in the crating orientation and that connect top 14 directly to bottom 12 in the collapsed orientation. The direct connection of top 14 and bottom 12 involves placing bottom edge 38a of front top wall section 38 directly on top of top edge 28a of front bottom wall section 28, placing a bottom edge of back top wall section 40 directly on top of top edge 30a of back bottom wall section 30, placing bottom edge 42a of side top wall section 42 directly on top of top edge 32a of side bottom wall section 32 and placing a bottom edge of side top wall section 44 directly on top of top edge 34a of side bottom wall section 34. Crate 10 is now in the collapsed orientation with top 14 and bottom 12 directly connected to each other and housing walls 16, 20, 22, 24 therebetween such at bottom 12, top 14 and walls 16, 20, 22, 24 are connected together as an integral unit that can be easily carried around by the user of crate 10. Crate 10 is advantageous in that in the collapsed orientation, bottom 12, top 14 and walls 16, 20, 22, 24 are all connected to each other in a manner such that none of bottom 12, top 14 and walls 16, 20, 22, 24 may loosely rattle around while being transported. More specifically, all of walls 16, 20, 22, 24 are connected to bottom 12 in the collapsed orientation, as side walls 22, 24 are connected to bottom 12 by horizontal hinges 54, 55 and front and back walls 16, 20 are connected to side walls 24, 22, respectively, by vertical hinges 51, 52, and thus are connected to bottom 12 via side walls 24, 22.

As shown in FIG. 8, top 14 is provided with a handle 60 configured for carrying crate 10 in both the collapsed orientation and in the crating orientation. Handle 60 is formed by a recessed surface 62 of top 14, which is in a recess 64 positioned between connectors 46 below curved surface of section 42 of top 14. Handle 60 is oriented such that crate can be carried by a user in a sideways orientation, in which is top 14 and bottom 12 are rotated 90 degrees with respect to the crating orientation, with top surface 36 extending approximately vertically to the ground.

Figure 10A:
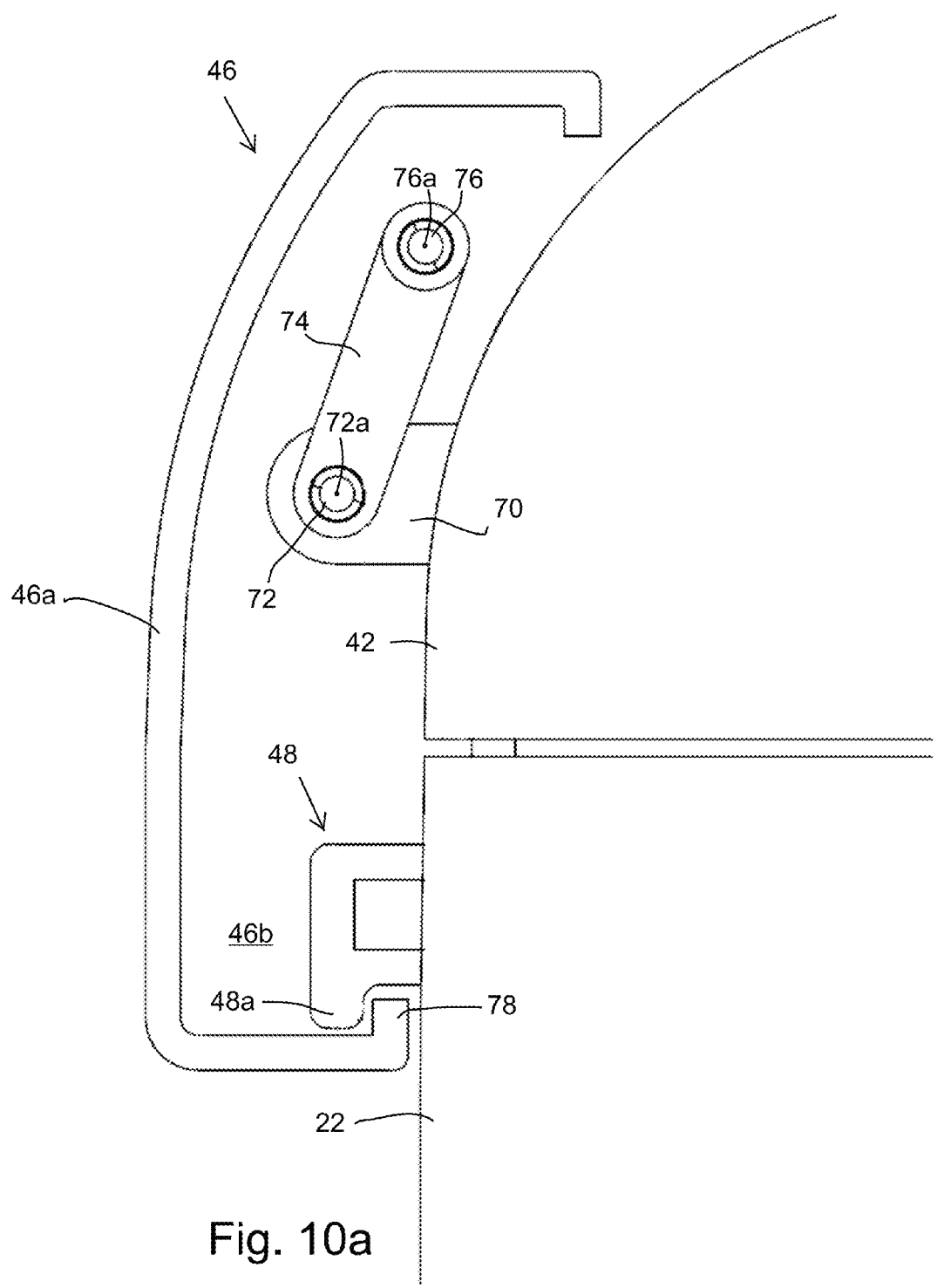
FIG. 10a shows an enlarged cross-sectional view of one top connector releasably engaging one wall protrusion in the first embodiment.

FIG. 10a shows an enlarged cross-sectional view of one connector 46 releasably engaging one protrusion 48. In the embodiment shown in FIG. 10a, connector 46 includes a support 70 fixed directly to the outer surface of section 42. Support 70 holds a shaft 72 that is fixed to a first end of an arm 74 at both ends of shaft 72 such that arm 74 is rotatably coupled to support 70 for rotation about an axis 72a of shaft 72. A second end of arm 74 is fixed to both ends of a shaft 76 that is fixed to leg 46a of connector 46 such that that leg 46a is rotatably coupled to arm 74 for rotation about an axis 76a of shaft 76. A bottom edge of leg 46a is provided with an upwardly extending lip 78 that engages a downwardly extending lip 48a of protrusion 48 to releasably engage connector 46 with protrusion 48. FIG. 10a shows connector 46 engaging protrusion 48 to hold top 14 onto wall 22. To release connector 46 from protrusion 48, leg 46a is pulled downward by the user such that leg 46a rotates about axis 76a while arm 74 rotates about axis 72a, the leg 46a is pulled upward and away from wall 22 such leg 46a rotates about axis 76a and lip is pulled outward past protrusion 48.

FIG. 10b shows an enlarged view of latch 50 and a latch receiving section 80 of side wall 22 and FIG. 10c shows a view of an interior portion of latch 50. In the embodiment shown in FIGS. 10b and 10c, latch 50 is provided at edge 16d of wall 16 and includes a vertically extending latch protrusion 50b configured for being received in and held in, by a friction and/or shape connection, a vertically extending groove 80a of latch receiving section 80 formed in edge 22d of wall 22 to releasably hold wall 16 onto wall 22. To release latch 50, an edge 50a of latch is pulled outward by the user, and the latch protrusion 50b is pulled out of groove 80a. For further latching, front wall 16 is provided with a lower protrusion 50c below lower edge 16a and an upper protrusion 50d above upper edge 16b. Bottom 12 is provided with a notch 80b in front wall section 28 for releasably holding lower protrusion 50c, by a friction and/or shape connection, and top 14 is provided with a notch 80c in front wall section 38 for releasably holding upper protrusion 50d, by a friction and/or shape connection.

Figure 11:
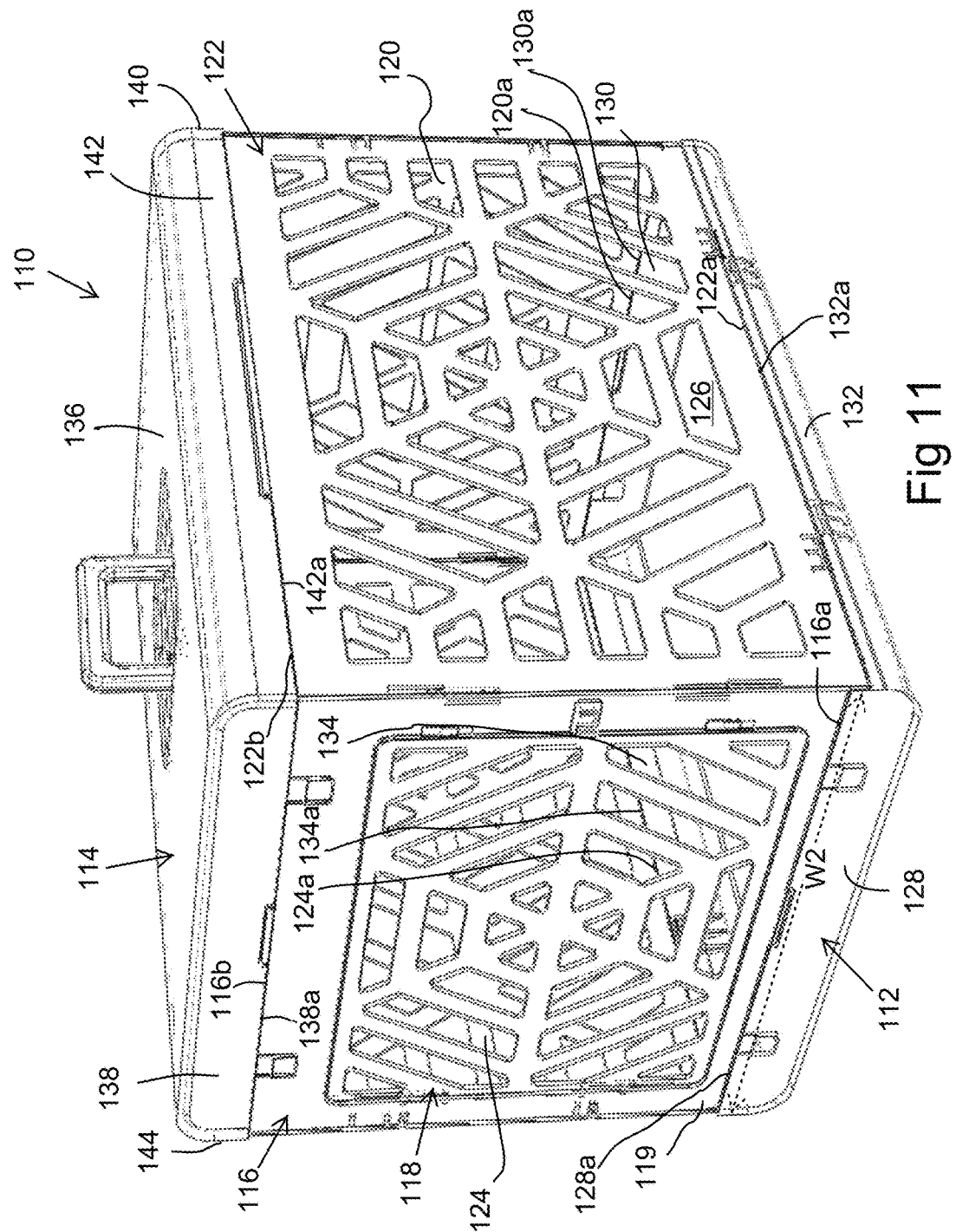
FIG. 11 shows a perspective view of a collapsible pet crate in accordance with a second embodiment of the present invention in a crating orientation.
Figure 19:
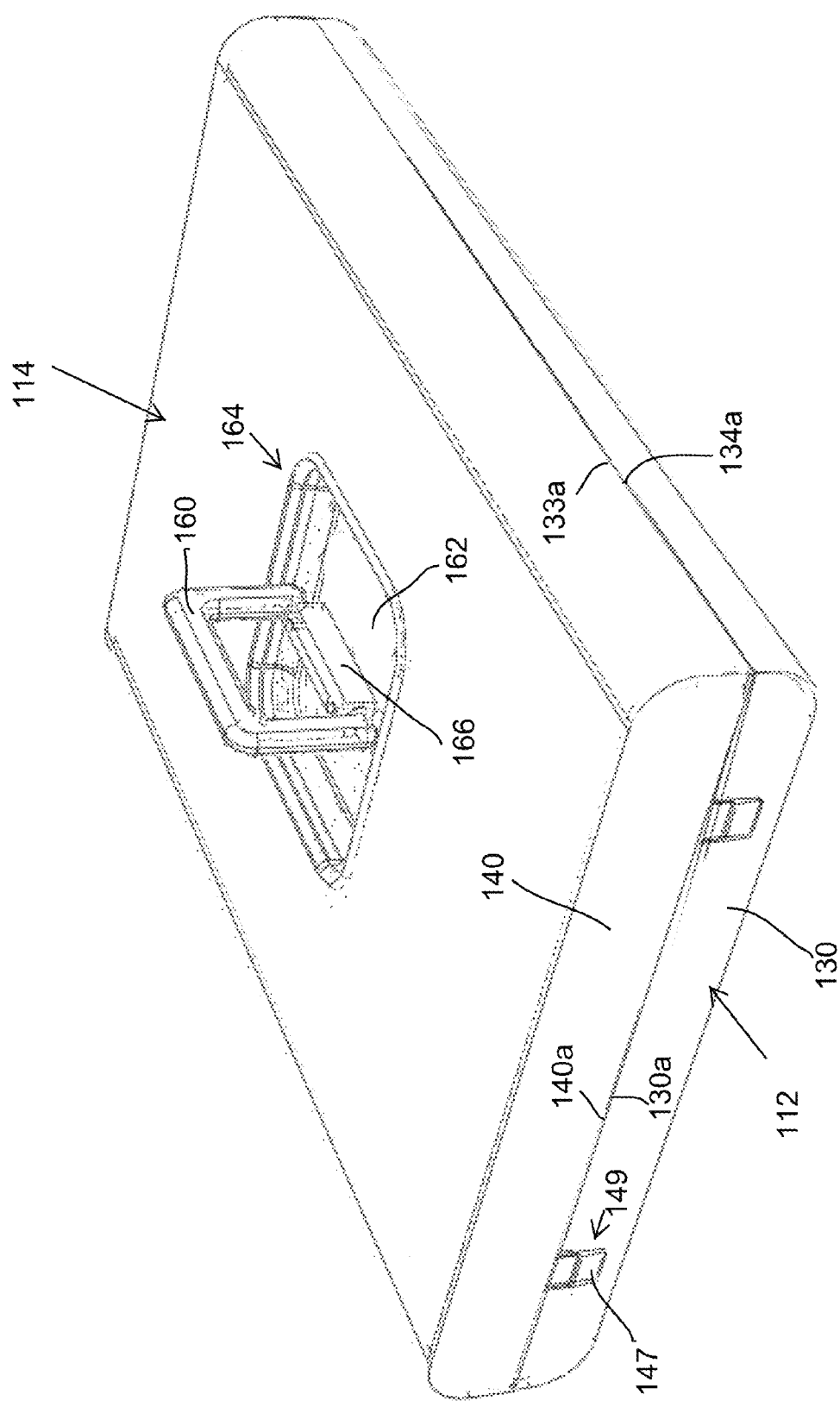
FIGS. 19 and 20 show the pet crate of the second embodiment in the collapsed orientation, with the first to fourth walls folded into the bottom and the top connected to the bottom.

FIG. 11 shows a perspective view of a collapsible pet crate 110 in accordance with another embodiment of the present invention. Pet crate 110 is configured for collapsing from a crating orientation, as shown in FIG. 11, in which pet crate 110 is oriented for housing a pet, to a collapsed orientation, as shown in FIG. 19, in which pet crate 110 can be easily carried. Pet crate 110 is formed as a cuboid with rounded corners and includes a bottom base 112, a top 114, a front wall 116 including a door 118, a back wall 120, a first side wall 122 and a second side wall 124. Door 118 is pivotably connected to a frame 119 of front wall 116 such that when crate 110 is in the crating orientation door 118 can be swung between an open orientation, in which a pet to can pass in and outer of front wall 116, and a closed orientation, in which door 118 is latched to frame 119. In a preferred embodiment, each of bottom base 112, top 114, front wall 116, back wall 120, first side wall 122 and second side wall 124 are formed of injected molded plastic. Walls 116, 120, 122, 124 are each provided with a plurality of slots formed therein to allow air to pass in and out of crate 110 in the crating orientation.

Base 112 includes a bottom wall 126 extending horizontally and four wall sections 128, 130, 132, 134 protruding vertically upward from bottom wall 126. More specifically, base 112 includes a front wall section 128, a back wall section 130, a first side wall section 132 and a second side wall section 134. In this embodiment, bottom wall 126 and wall sections 128, 130, 132, 134 are formed integrally as a single rigid piece.

Top 114 includes a top wall 136 extending horizontally, parallel to bottom wall 126, and four wall sections 138, 140, 142, 144 protruding vertically downward from top wall 136. More specifically, top 114 includes a front wall section 138, a back wall section 140, a first side wall section 142 and a second side wall section 144. In this embodiment, top wall 136 and wall sections 138, 140, 142, 114 are formed integrally as a single rigid piece.

Side walls 122, 124 each are of a width W1 that is greater than a width W2 of each of front wall 116 and back wall 120. Wall sections 132, 134, 142, 144 also have a width W1 and wall sections 128, 130, 138, 140 also have a width W2. As used herein, the term front wall is used to denote the wall with the door, while back wall is used to denote the wall opposite the front wall and the side walls are those that extend between the front and back walls. As noted above, in this embodiment door 118 is provided in front wall 116, which is one of the narrower walls. In other embodiments, the front wall and back wall may be wider than the side walls.

In the crating orientation, front wall 116 is sandwiched vertically between bottom front wall section 128 and top front wall section 138, back wall 120 is sandwiched vertically between bottom front wall section 130 and top front wall section 140, first side wall 122 is sandwiched vertically between bottom first side wall section 132 and top first side wall section 142 and second side wall 124 is sandwiched vertically between bottom second side wall section 134 and top second side wall section 144. More specifically, with respect to front wall 116, a bottom horizontally extending edge 116a of wall 116 rests on top of a top horizontally extending edge 128a of bottom front wall section 128 and a bottom horizontally extending edge 138a of top front wall section 138 rests on top of a top horizontally extending edge 116b of front wall 116. Similarly, with respect to back wall 120, a bottom horizontally extending edge 120a of wall 120 rests on top of a top horizontally extending edge 130a of bottom back wall section 130 and a bottom horizontally extending edge of top front wall section 140 rests on top of a top horizontally extending edge 120b (FIG. 12) of back wall 120; with respect to first side wall 122, a bottom horizontally extending edge 122a of wall 122 rests on top of a top horizontally extending edge 132a of bottom first side wall section 132 and a bottom horizontally extending edge of top side wall section 142 rests on top of a top horizontally extending edge 122b (FIG. 12) of side wall 122; with respect to second side wall 124, a bottom horizontally extending edge 124a of wall 124 rests on top of a top horizontally extending edge 134a of bottom second side wall section 134 and a bottom horizontally extending edge 144a of top side wall section 144 rests on top of a top horizontally extending edge 124b of side wall 124.

Front side wall 116 is pivotably connected to first side wall 122 such that walls together form a first wall pair and back wall 120 is pivotably connected to second side wall 124. Top 114 is removably connected to at least one of the walls 116, 122 of the first wall pair and to at least one of the walls 120, 124 of second wall pair. In preferred embodiments, top 114 is removably connected to at least two opposing walls, with front wall 116 and back wall 120 being opposing walls and first side wall 122 and second side wall 124 being opposing side walls. In other words, top 114 may be removably connected to at least both of front and back walls 116, 120 or to at least both of side walls 122, 124. In the embodiment shown in FIGS. 11 to 20, in the crating orientation, top 114 is removably connected to front wall 116 and back wall 120 and is not connected to side walls 122, 124. As implied above, in other embodiments, top 114 may be removably connectable to all of walls 116, 120, 122, 124.

Figure 12:
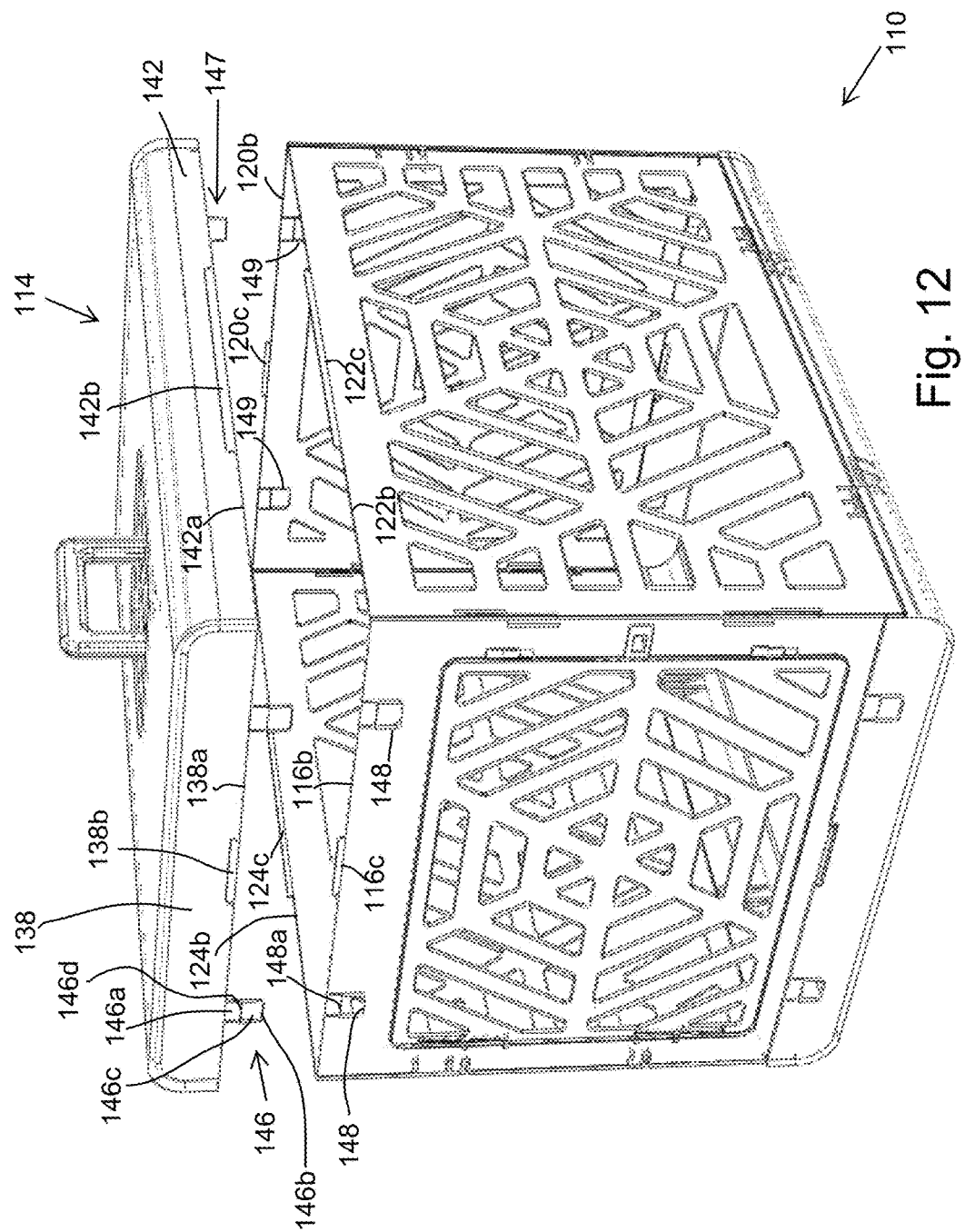
FIG. 12 shows the pet crate of the second embodiment in an intermediate orientation in which a top is removed from walls of the pet crate.

FIG. 12 shows top 114 disconnected from both of the side wall pairs. As is apparent from FIG. 12, top 114 is removably connectable to front wall 116 by a first pair of connectors that each are configured for removably connecting to a respective connecting section of wall 116 and by a second pair of connectors 147 that each are configured for removably connecting to a respective connecting section of wall 120. More specifically, top 114 is removably connectable to front wall 116 by a first pair of connectors in the form of tabs 146 that each snap into a corresponding one of two slots 148 formed in front wall 116 near top edge 116b and top 114 is removably connectable to back wall 120 by a second pair of connectors in the form of tabs 147 that each snap into a corresponding one of the two slots 149 formed in back wall 120 near top edge 120b. Tabs 146 each include a leg 146a extending downward from bottom edge 138a and clip 146b protruding from a leg 146b of tab 146. Clip 146b includes a front facing tapered surface 146c configured for contacting top edge 116b when top 114 is forced downward onto walls 116, 120, 122, 124 to force a frontmost portion 146d of clip 146b, which is at an edge of inclined surface 146c, inward until frontmost portion 146d enters into the corresponding slot 148 such that clip 146b secures top 114 to wall 116 via contact with a top edge 148a of slot 148. Once clips 146b are received in slots 148, top 114 may then be disconnected from wall 116 by pressing clips 146b inwardly and pulling top 114 upwardly. Tabs 147 are formed in the same manner as tabs 146 and interact with back wall 120 in the same manner to connect top 114 to and disconnect top 114 from wall 120.

Walls 116, 120, 122, 124 also each include upwardly extending projections 116c, 120c, 122c, 124c, respectively, at their respective top edges 116b, 120b, 122b, 124b configured for being received in corresponding slots in wall sections 138, 140, 142, 144 of top 114 to align walls sections 138, 140, 142, 144 with the respective walls 116, 120, 122, 124 and add further stability to the connection between top 114 and the wall pairs. Slot 138b of wall section 138 for receiving projection 116c and slot 142b of wall section 142 for receiving projection 124c are shown in FIG. 12.

Figure 13:
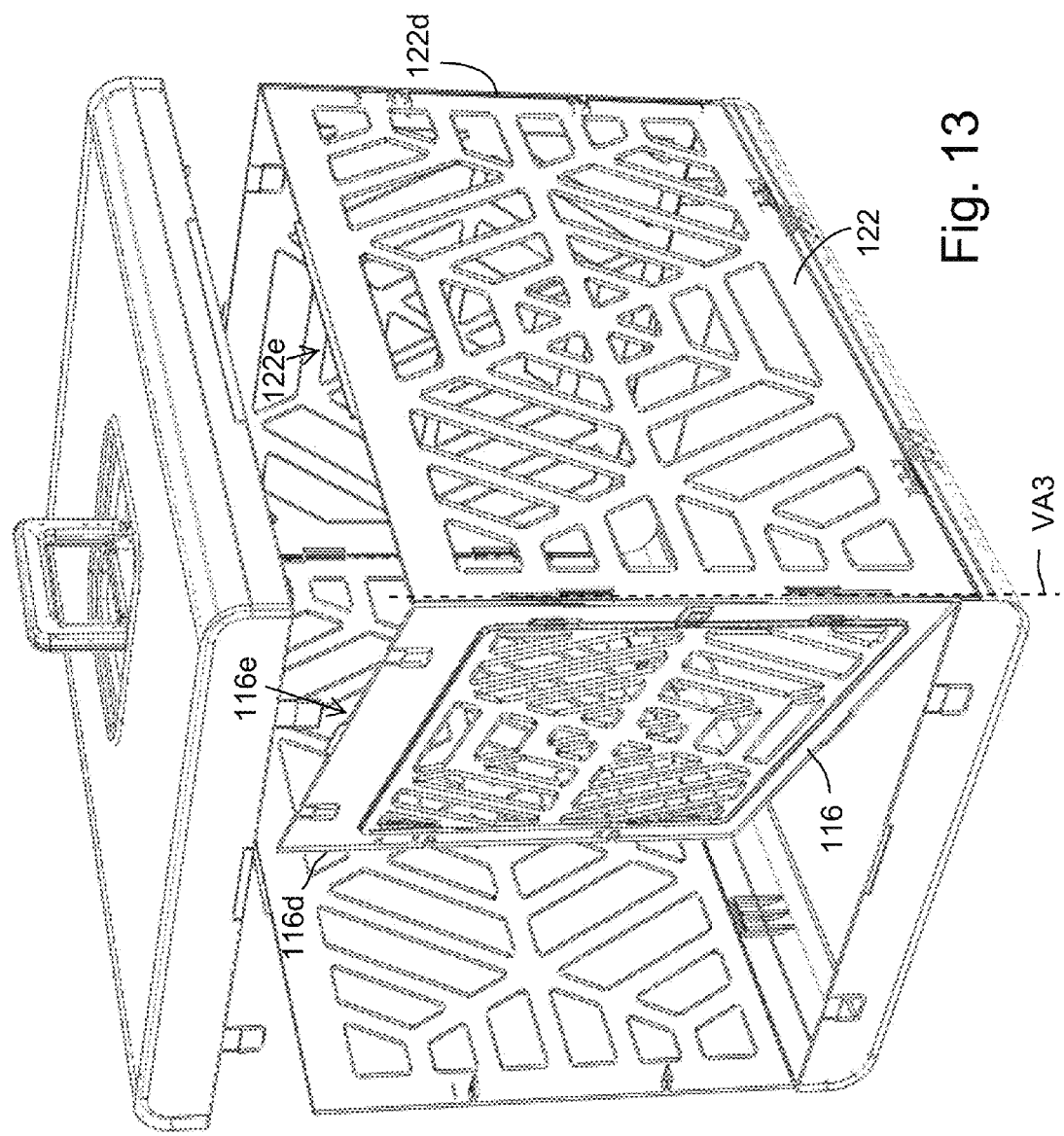
FIG. 13 shows the pet crate of the second embodiment in another intermediate orientation with a first wall partially pivoted about a vertical axis with respect to a second wall.
Figure 14:
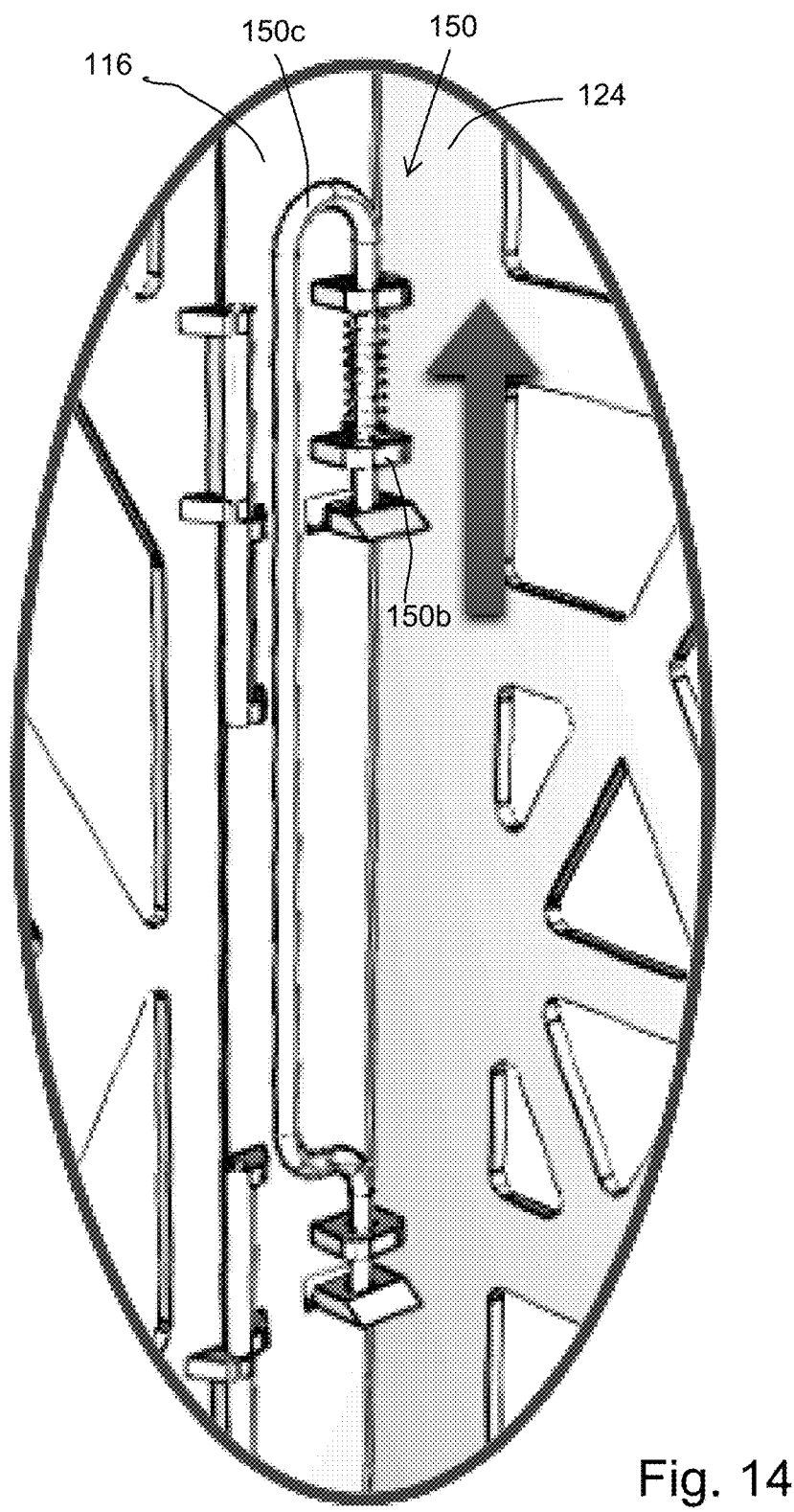
FIG. 14 shows a lock for locking the first and second walls together in the second embodiment.

Referring now to FIG. 13, front wall 116 is pivotably connected to second side wall 122 by for example at least one hinge 51 (FIG. 15) such that when top 114 is disconnected from walls 116, 120 and removed from walls 116, 120, 122, 124, front wall 116 is pivotable with respect to side wall 122 about a first vertically extending axis VA3. In the crating orientation, when top 114 is connected to wall 116 by tabs 146, tabs 146 prevent front wall 116 from being swung about axis VA3 toward side wall 122 and projection 116c prevents front wall 116 from being swung about axis VA3 away from side wall 122. By front wall 116 being swung away from side wall 122, it is meant that a free side edge 116d of front wall 116 moves further away from a back side edge 122d of side wall 122, and by front wall 116 being swung toward side wall 122, it is meant that free side edge 116d of front wall 116 moves closer to a back side edge 122d of side wall 122. As shown in FIG. 14, a lock 150 may also be provided for fixing front wall 116 to second side wall 124 to prevent front wall 116 from being pivoted about axis VA3. Lock 150 may include a first section 150a fixed to second side wall 124, a second section 150b fixed to front wall 116 and a third section 150c movable between a first orientation in which walls 116, 124 are locked together by connecting sections 150a, 150b together with section 150c and to unlock walls 116, 124 from each other by disconnecting sections 150a, 150b from each other. Referring to FIGS. 13 and 14 together, when lock 150 is in an unlocked orientation, front wall 116 may be swung toward side wall 122 such that an interior surface 116e of front wall 116 contacts an interior surface 122e of side wall 122. As used herein, interior surfaces of walls 116, 120, 122, 124 refer to surfaces of walls 116, 120, 122, 124 that face an interior of crate 110 when crate 110 is in the crating orientation and exterior surfaces of walls refer to surfaces of walls 116, 120, 122, 124 that face an interior of crate 110 when crate 110 is in the crating orientation.

Figure 15:
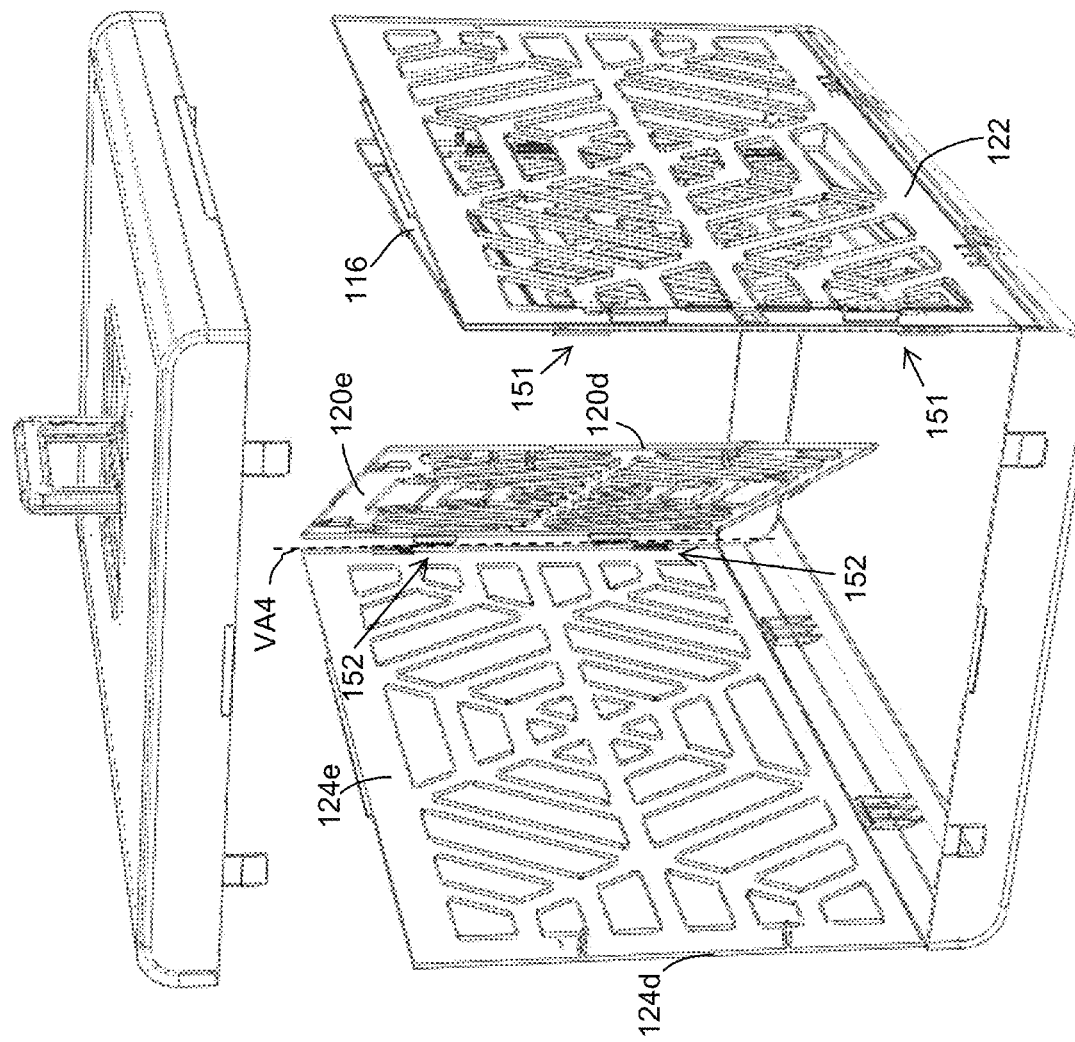
FIG. 15 shows the pet crate of the second embodiment in another intermediate orientation with the first wall fully pivoted about the vertical axis toward the second wall and a third wall partially pivoted about a vertical axis with respect to a fourth wall.

FIG. 15 shows a view of crate 110 after front wall 116 has been swung toward side wall 124 such that at least a portion of interior surface 116e contacts interior surface 124e and edge 116d is closest to edge 124d, and after back wall 120 has been swung partially toward side wall 124. Back wall 120 is pivotably connected to first side wall 124 by for example at least one hinge 152 such that when top 114 is disconnected from walls 116, 120 and removed from walls 116, 120, 122, 124, back wall 120 is pivotable with respect to side wall 124 about a first vertically extending axis VA4. In the crating orientation, when top 114 is connected to wall 120 by tabs 47, tabs 47 prevent back wall 120 from being swung about axis VA4 toward side wall 124 and projection 120c prevents back wall 120 from being swung about axis VA4 away from side wall 124. By back wall 120 being swung away from side wall 124, it is meant that a free side edge 120d of back wall 120 moves further away from a front side edge 124d of side wall 124, and by back wall 120 being swung toward side wall 124, it is meant that free side edge 120d of back wall 120 moves closer to a front side edge 124d of side wall 124. Similarly to lock 150, a lock may also be provided for locking back wall 120 to second side wall 124 to prevent front wall 120 from being pivoted about axis VA4. When the lock for back wall 120 is in an unlocked orientation, back wall 120 may be swung toward side wall 124 such that an interior surface 120e of back wall 120 contacts an interior surface 124e of side wall 124.

Figure 16:
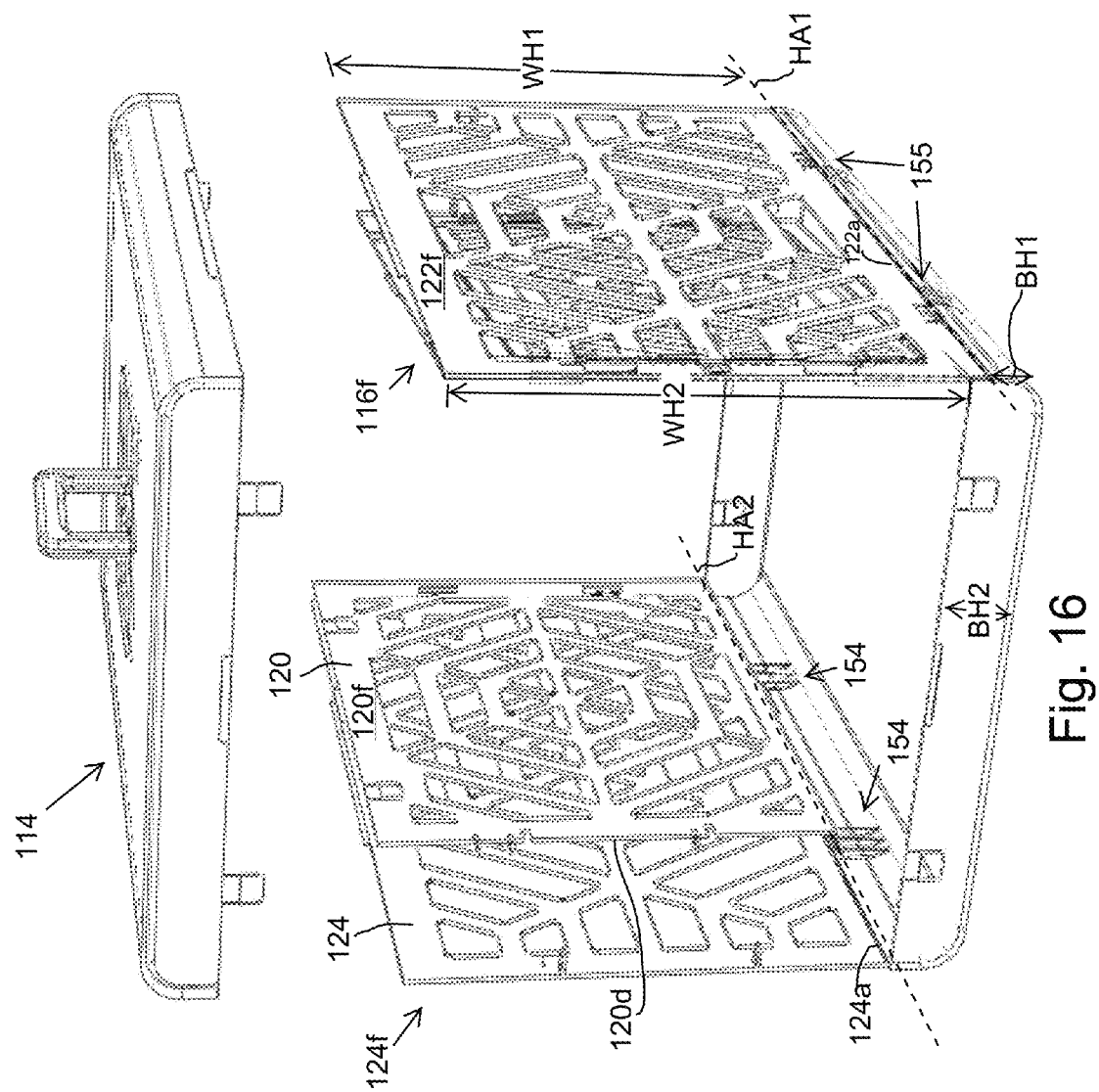
FIG. 16 shows the pet crate of the second embodiment in another intermediate orientation with the first wall fully pivoted about the vertical axis toward the second wall and the third wall fully pivoted about the vertical axis toward the fourth wall.

FIG. 16 shows a view of crate 110 after back wall 120 has been swung toward side wall 124 such that at least a portion of interior surface 120e contacts interior surface 124e and edge 120d is closest to edge 124d. Side wall 122, along bottom edge 122a, is pivotably connected to side wall section 132 of bottom 112 such that when top 114 is disconnected from walls 116, 120 and removed from walls 116, 120, 122, 124, particularly when interior surface 116e of front wall 116 is pressed against interior surface 122e of side wall 122, side wall 122 is pivotable with respect to side wall section 132 about a first horizontally extending axis HA1. Similarly, side wall 124, along bottom edge 124a, is pivotably connected to side wall section 134 of bottom 112 such that when top 114 is disconnected from walls 116, 120 and removed from walls 116, 120, 122, 124, particularly when interior surface 120e of back wall 120 is pressed against interior surface 124e of side wall 124, side wall 124 is pivotable with respect to side wall section 134 about a horizontally extending axis HA2. Side wall 124 is pivotably connected to side wall section 134 of bottom 112 by for example at least one hinge 154, while side wall 122 is pivotably connected to side wall section 132 of bottom 112 by for example at least one hinge 55 configured in the same manner as hinge 154.

Bottom wall sections 128, 130, 134 each have a height of BH1, while bottom wall section 132 has a height of BH2 that is less than BH1. Due to the reduced height of wall section 132, side wall 122 has a height WH1 that is greater than a height WH2 of each of walls 116, 120, 124 such that the top edges of walls 116, 120, 122, 124 are all positioned at a same height and along a same horizontal plane when walls 116, 120, 122, 124 are in the crating orientation. Heights BH1, BH2 are measured from the bottommost edges of sections 128, 130, 132, 134, i.e., from a plane of a bottom surface of bottom wall 126, to top edges 128a, 130a, 132a, 134aa, respectively. Bottom wall section 132 has a lesser height BH2 than sections 128, 130, 134, in particular section 134, such first horizontal axis HA1 is at a vertical height that is lower than second horizontal axis HA2 and the first wall pair, i.e., walls 116, 122, may be swung downward about axis HA1 to rest against a top surface 126a of bottom wall 126, then the second wall pair, i.e, walls 120, 124, may be swung downward about axis HA2 to rest on top of the first wall pair. More specifically, walls 116, 122 may be together swung, with wall 116 being swung onto wall 122 such that walls 116, 122 are substantially parallel to each other and interior surfaces 116e, 122e face each other, downward about axis HA1 such that at least a portion of exterior surface 116f of front wall 116, for example a portion directly adjacent to top edge 116b, contacts top surface 126a of bottom wall 126. Next, walls 120, 124 may be together swung, with wall 120 being swung onto wall 124 such that walls 120, 124 are substantially parallel to each other and interior surfaces 120e, 124e face each other, downward about axis HA2 such that at least a portion of exterior surface 120f of back wall 120, for a portion directly adjacent to example top edge 120b, contacts exterior surface 122f of side wall 122.

Figure 17:
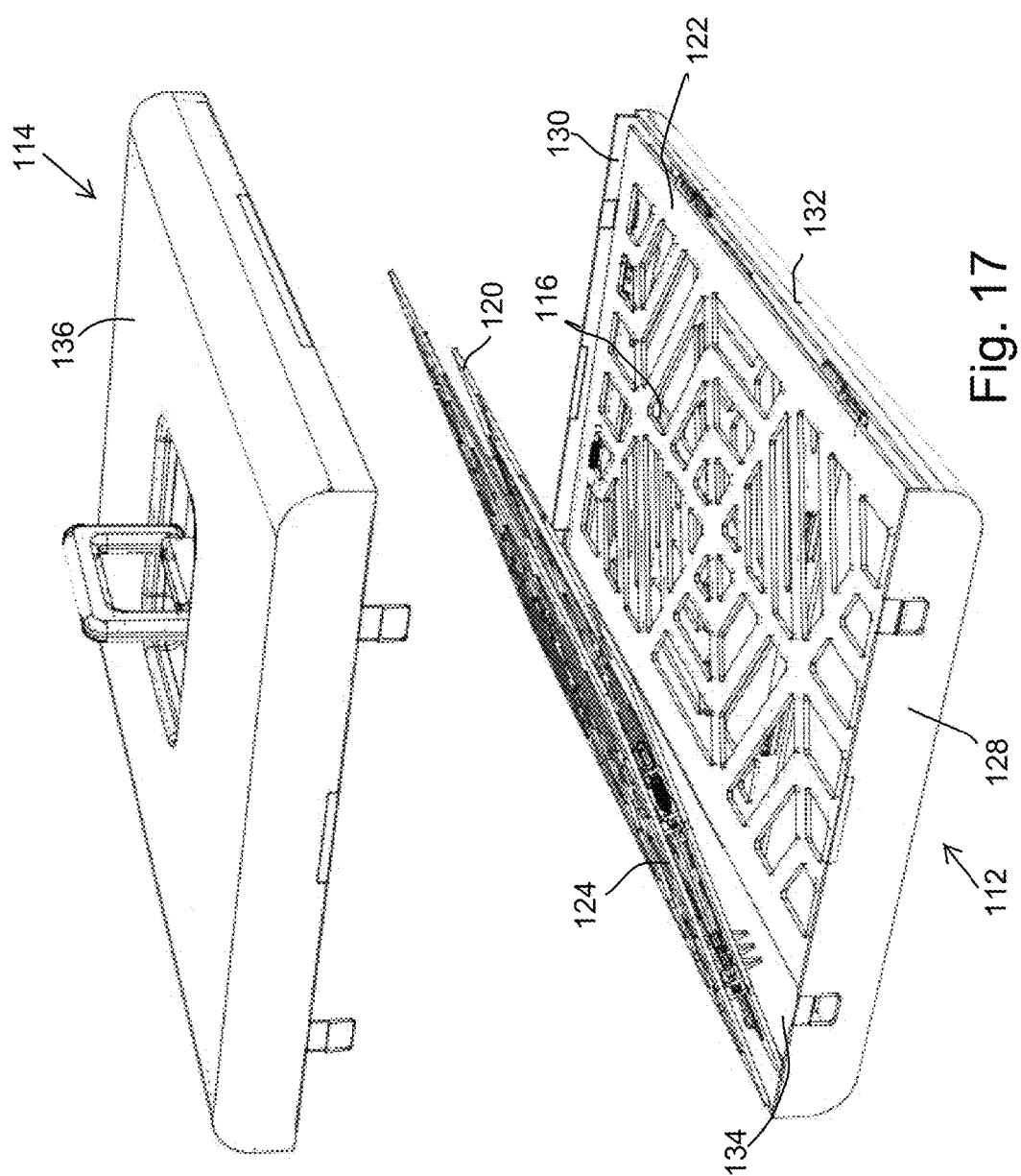
FIG. 17 shows the pet crate of the second embodiment in another intermediate orientation with the first wall folded against the second wall and the first and second walls fully pivoted about a first horizontal axis and folded into the bottom, while the third wall is folded against the fourth wall and the third and fourth walls partially pivoted about a second horizontal axis downward.
Figure 18:
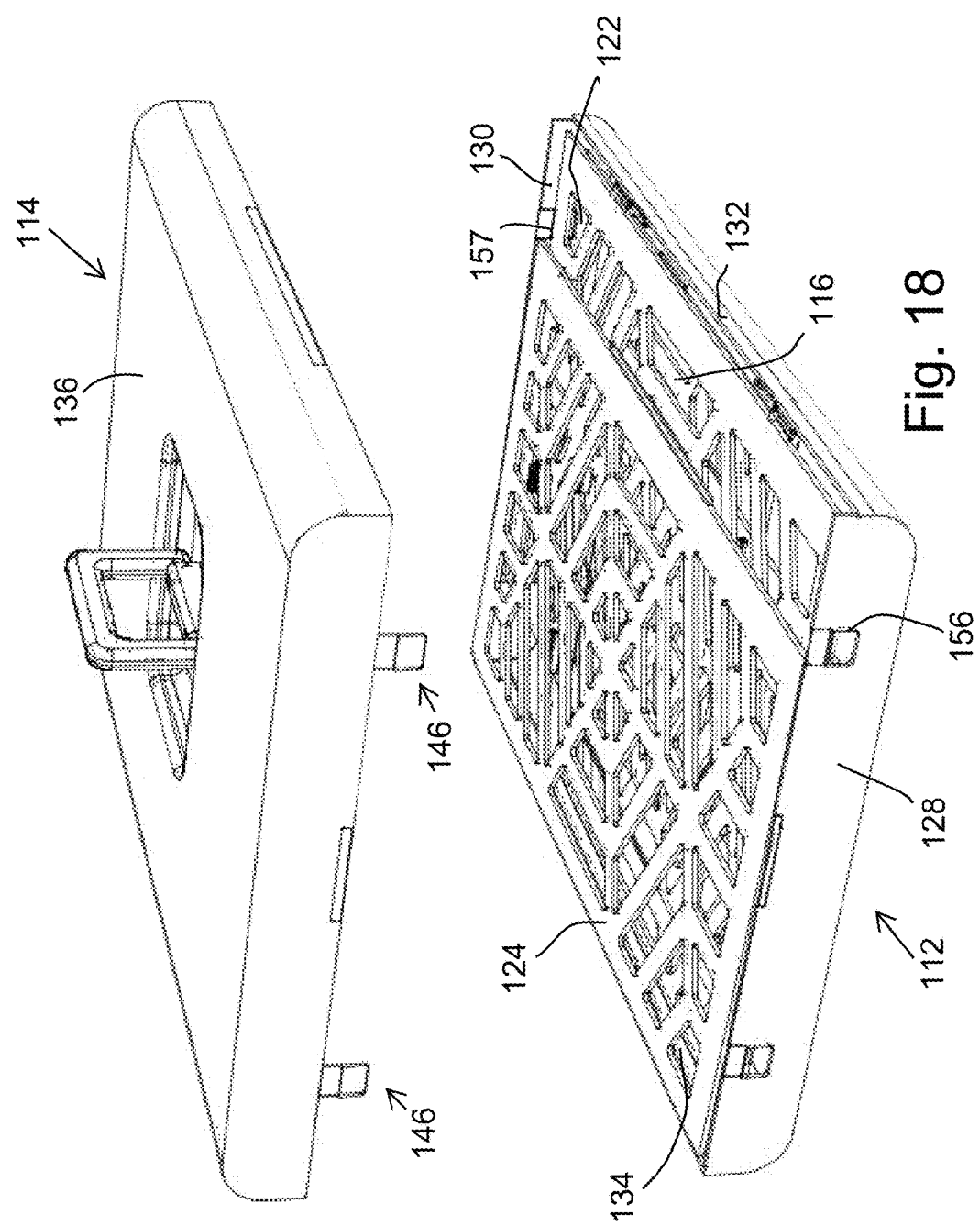
FIG. 18 shows the pet crate of the second embodiment with the first to fourth walls in the collapsed orientation in the bottom, with the first and second walls fully pivoted about the first horizontal axis and folded into the bottom and the third and fourth walls fully pivoted about the second horizontal axis and folded into the bottom on top of the first and second walls.

The pivoting of the wall pairs about axes HA1, HA2 (FIG. 16) is illustrated in FIGS. 17 and 18. FIG. 17 shows pet crate 110 with the front wall 116 folded against side wall 122 and walls 116, 122 fully pivoted about first horizontal axis HA1 and folded into bottom 112, while back wall 120 is folded against side wall 124 and walls 120, 124 are partially pivoted about second horizontal axis HA2 downward toward bottom 112. FIG. 18 shows pet crate 110 with walls 116, 120, 122, 124 in the collapsed orientation in bottom 112, with walls 116, 122 fully pivoted about the first horizontal axis HA1 and folded into bottom 112 and walls 120, 124 fully pivoted about the second horizontal axis HA2 and folded into bottom 112 on top of walls 116, 122.

Figure 20:
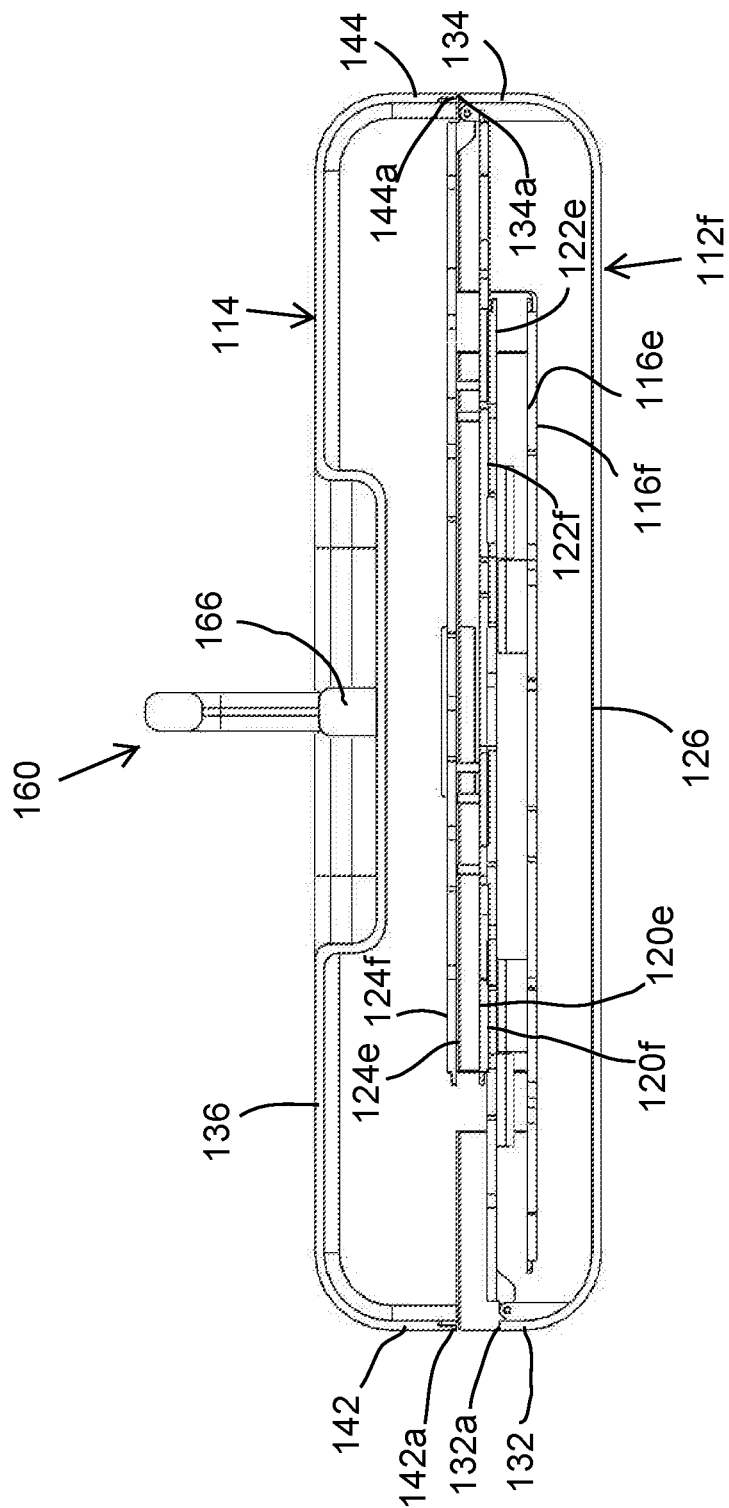

Fully pivoting walls 116, 120, 122, 124 downward into bottom 112 positions walls 116, 120, 122, 124 between wall sections 128, 130, 132, 134 such that at least a majority of the structures of walls 116, 120, 122, 124 taken together is positioned entirely within bottom 112. More specifically, the walls 116, 120, 122, 124 are folded into bottom 112 a sufficient amount to allow top 114 to be connected to bottom 112 such that walls 116, 120, 122, 124 are enclosed within bottom 112 and top 114 and walls 116, 120, 122, 124 are arranged in a space extending vertically between top wall 136 of top 114 and bottom wall 126 (FIG. 11) of bottom 112. When in the collapsed orientation in bottom 112, as shown in FIGS. 19 and 20, the first wall pair is sandwiched vertically between bottom wall 126 and the second wall pair. More specifically, when walls 116, 120, 122, 124 are in the collapsed orientation, front wall 116 is positioned on top of bottom wall 126, side wall 122 is positioned on top of front wall 116, back wall 120 is positioned on top of side wall 122 and side wall 124 is positioned on top of back wall 120. Even more specifically, when walls 116, 120, 122, 124 are in the collapsed orientation, exterior surface 116f of front wall 116 directly faces and/or contacts top surface 126a of bottom 126, interior surface 122e of side wall 122 directly faces and/or contacts interior surface 116e of front wall 116, exterior surface 120f of back wall 122 directly faces and/or contacts exterior surface 122f of side wall 122, and interior surface 124e of side wall 124 directly faces and/or contacts interior surface 120e of back wall 120. In the embodiment shown in FIG. 20, walls 116, 120, 122, 124 are all arranged parallel to bottom wall 126. When top 114 is connected to bottom 112, exterior surface 124f of side wall 124 directly faces a bottom surface of top wall 136.

As shown in FIG. 19, after the wall pairs are folded about the respective axes HA1, HA2 into bottom 112, top 114 can be removably connected directly to bottom 112 by inserting tabs 146 into slots 156 in front wall section 128, while inserting tabs 47 into slots 57 in back wall section 130. Accordingly, tabs 47, 49 form connectors that connect top 114 directly to the wall pairs in the crating orientation and that connect top 114 directly to bottom 112 in the collapsed orientation. The direct connection of top 114 and bottom 112 involves placing bottom edge 138a of front top wall section 138 directly on top of top edge 128a of front bottom wall section 128, placing a bottom edge of back top wall section 140 directly on top of top edge 130a of back bottom wall section 130, placing bottom edge 142a of side top wall section 142 directly facing, but slightly spaced apart from top edge 132a of side bottom wall section 132 and placing a bottom edge of side top wall section 144 directly on top of top edge 134a of side bottom wall section 134. Crate 110 is now in the collapsed orientation with top 114 and bottom 112 directly connected to each other and housing walls 116, 120, 122, 124 therebetween such at bottom 112, top 114 and walls 116, 120, 122, 124 are connected together as an integral unit that can be easily carried around by the user of crate 110. Crate 110 is advantageous in that in the collapsed orientation, bottom 112, top 114 and walls 116, 120, 122, 124 are all connected to each other in a manner such that none of bottom 112, top 114 and walls 116, 120, 122, 124 may loosely rattle around while being transported. More specifically, all of walls 116, 120, 122, 124 are connected to bottom 112 in the collapsed orientation, as side walls 122, 124 are connected to bottom 112 by horizontal hinges 154, 55 and front and back walls 116, 120 are connected to side walls 122, 124, respectively, by vertical hinges 51, 152, and thus are connected to bottom 112 via side walls 122, 124.

As shown in FIGS. 19 and 20, top 114 is provided with a handle 160 configured for carrying crate 110 in both the collapsed orientation and in the crating orientation. Handle 160 is connected to a recessed surface 162 of top 114, which is in a recess 164 below top wall 136, by a base 166. Handle 160 is pivotably connected to base 166 such that handle 160 is positionable in a vertical orientation for carrying crate or a horizontal orientation in which an entirety of handle 160 is within the recess 164 and is an uppermost surface of handle 160 in the horizontal orientation is at or below a plane of top wall 136.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A collapsible pet crate comprising:
   a top;
   a bottom base; and
   a plurality of walls including a first wall pair, the first wall pair including a first wall pivotably connected to the bottom base for pivoting about a first horizontal axis and a second wall pivotably connected to the first wall for pivoting about a first vertical axis, the collapsible pet crate being configured for arrangement in a crating orientation in which the top is removably connected to at least one of the walls and a collapsed orientation in which the top is removably connected to the bottom base.

2. The collapsible pet crate as recited in claim 1 wherein the walls include a second wall pair including a third wall pivotably connected to the bottom base for pivoting about a second horizontal axis and a fourth wall pivotably connected to the third wall for pivoting about a second vertical axis.

3. The collapsible pet crate as recited in claim 2 wherein the first wall and the third wall are positioned opposite of each other in the crating orientation and the second wall and the fourth wall are positioned opposite of each other in the crating orientation.

4. The collapsible pet crate as recited in claim 2 wherein, for transitioning from the crating orientation to the collapsed orientation, the second wall is configured to pivot about the first vertical axis onto the first wall such that the first wall pair is pivotable about the first horizontal axis together into the bottom base.

5. The collapsible pet crate as recited in claim 4 wherein, in the collapsed orientation, the first wall pair directly faces a top surface of a bottom wall of the bottom base.

6. The collapsible pet crate as recited in claim 4 wherein, for transitioning from the crating orientation to the collapsed orientation, the fourth wall is configured to pivot about the second vertical axis onto the third wall such that the second wall pair is pivotable about the second horizontal axis together into the bottom base.

7. The collapsible pet crate as recited in claim 6 wherein, in the collapsed orientation, the second wall pair rests on top of the first wall pair.

8. The collapsible pet crate as recited in claim 2 wherein the top includes a horizontally extending top wall and a plurality of wall sections projecting vertically downward from the top wall, a bottom edge of at least one of the wall sections resting on a top edge of at least one of the first, second, third, or fourth walls when the pet crate is in the crating orientation.

9. The collapsible pet crate as recited in claim 8 wherein the bottom edge of the at least one of the wall sections rests on a top edge of the bottom base when the pet crate is in the collapsed orientation.

10. The collapsible pet crate as recited in claim 2 wherein the top includes at least one first connector configured for removably connecting the top to at least one of the first or second walls in the crating orientation and at least one second connector configured for removably connecting the top to at least one of the third or fourth walls in the crating orientation.

11. The collapsible pet crate as recited in claim 10 wherein the at least one first connector and the at least one second connector are configured for removable connecting the top to the bottom base in the collapsed orientation.

12. The collapsible pet crate as recited in claim 11 wherein the bottom base includes a horizontally extending bottom wall and first, second, third and fourth wall sections projecting vertically upward from the bottom wall, the first wall being pivotably connected to the first wall section by at least one first hinge, the third wall being pivotably connected to the third wall section by at least one second hinge.

13. The collapsible pet crate as recited in claim 11 wherein the first or second wall section includes at least one first connecting section for removably connecting to the at least one first connector and the third or fourth wall section includes at least one second connecting section for removably connecting to the at least one second connector for removably connecting the top to second and fourth wall sections in the collapsed orientation.

14. The collapsible pet crate as recited in claim 10 wherein the first or second wall includes at least one connecting section for removably connecting to the at least one first connector and the third or fourth wall includes at least one connecting section for removably connecting to the at least one second connector for removably connecting the top to the second and fourth walls in the crating orientation.

15. The collapsible pet crate as recited in claim 1 wherein the top includes a handle configured for carrying the pet crate in both the crating orientation and the collapsed orientation.

16. A method of providing a collapsible pet crate comprising:
    pivotably connecting a first wall to a bottom base such that the first wall is pivotable with respect to the bottom base about a first horizontal axis;
    pivotably connecting a second wall to the first wall such that the second wall is pivotable with respect to the first wall about a first vertical axis; and
    providing a top configured for being removably connected to at least one of the walls in a crating orientation and configured for being removably connected directly to the bottom base in a collapsed orientation.

\* \* \* \* \*